United States Patent
Chaudhry et al.

(10) Patent No.: US 11,629,884 B2
(45) Date of Patent: Apr. 18, 2023

(54) TANK-BASED AND TANKLESS WATER HEATER SYSTEMS

(71) Applicant: Rheem Manufacturing Company, Atlanta, GA (US)

(72) Inventors: Raheel A. Chaudhry, Montgomery, AL (US); David I. Vega, Montgomery, AL (US); Michael C. Mitchell, Auburn, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 429 days.

(21) Appl. No.: 16/834,404

(22) Filed: Mar. 30, 2020

(65) Prior Publication Data

US 2020/0224927 A1 Jul. 16, 2020

Related U.S. Application Data

(62) Division of application No. 15/830,552, filed on Dec. 4, 2017, now Pat. No. 10,605,486.

(51) Int. Cl.
*F24H 9/00* (2022.01)
*F24H 9/20* (2022.01)
(Continued)

(52) U.S. Cl.
CPC ....... *F24H 9/2007* (2013.01); *F24D 19/1051* (2013.01); *F24H 1/22* (2013.01);
(Continued)

(58) Field of Classification Search
CPC .................................................... F24H 9/2007
See application file for complete search history.

(56) References Cited

U.S. PATENT DOCUMENTS 7,058,457 B2   6/2006   Kuwahara et al.
8,175,752 B2   5/2012   Deivasigamani et al.
(Continued)

FOREIGN PATENT DOCUMENTS

CN    201121974    9/2008
EP    2136152     12/2009
(Continued)

OTHER PUBLICATIONS

JP2003222399A—machine translation (Year: 2003).*
International Search Report for PCT/US2018/060006, dated Feb. 21, 2019.

*Primary Examiner* — Nathaniel Herzfeld
(74) *Attorney, Agent, or Firm* — Eversheds Sutherland (US) LLP

(57) ABSTRACT

A water heating system can include a first tank-based water heater having a first inlet line and a first outlet line, where the first inlet line provides unheated water to the first tank, and where the first outlet line draws heated water from the first tank. The system can also include a first tankless water heater having a second outlet line, where the second outlet line of the first tankless water heater provides the heated water to a first heated water demand. The system can also include a first valve that controls an amount of the unheated water flowing through the first inlet line to the first tank-based water heater. The system can further include a controller operatively coupled to the first valve, where the controller controls a position of the first valve based on the first heated water demand and a first capacity of the first tankless water heater.

19 Claims, 12 Drawing Sheets

(51) Int. Cl.
 *F24H 1/22* (2022.01)
 *G05D 23/19* (2006.01)
 *G05B 15/02* (2006.01)
 *F24D 19/10* (2006.01)
 *F24H 9/13* (2022.01)
 *F24H 1/20* (2022.01)

(52) U.S. Cl.
 CPC .............. *F24H 9/13* (2022.01); *F24H 9/2028* (2013.01); *G05B 15/02* (2013.01); *G05D 23/19* (2013.01); *F24H 1/202* (2013.01)

(56) References Cited

U.S. PATENT DOCUMENTS

| | | |
|---|---|---|
| 2004/0176858 A1 | 9/2004 | Kuwahara et al. |
| 2008/0197205 A1 | 8/2008 | Ene et al. |
| 2011/0305444 A1 | 12/2011 | Pussell |
| 2012/0060827 A1 | 3/2012 | Roetker |
| 2012/0090560 A1 | 4/2012 | Iwama et al. |
| 2012/0325337 A1* | 12/2012 | Nakagawa ............... F24H 1/122 137/341 |
| 2014/0202549 A1 | 7/2014 | Hazzard et al. |
| 2015/0047578 A1 | 2/2015 | Lesage |
| 2016/0061508 A1 | 3/2016 | Lowrimore et al. |
| 2019/0293303 A1 | 9/2019 | Zhang |

FOREIGN PATENT DOCUMENTS

| | | | |
|---|---|---|---|
| GB | 2461077 | | 12/2009 |
| JP | 2003222399 | A * | 8/2003 |
| JP | 2017133735 | A | 8/2017 |
| KR | 101039497 | | 6/2011 |
| KR | 20140114776 | | 9/2014 |
| SU | 985631 | | 12/1982 |

* cited by examiner

TANK-BASED AND TANKLESS WATER HEATER SYSTEMS

CROSS-REFERENCE TO RELATED APPLICATIONS

This application is a divisional of, and claims priority to, U.S. patent application Ser. No. 15/830,552, filed on 4 Dec. 2017, the disclosure of which is herein incorporated by reference in its entirety.

TECHNICAL FIELD

The present disclosure relates generally to water heaters, and more particularly to systems, methods, and devices for managing multiple water heaters as part of a system.

BACKGROUND

Water heaters are generally used to provide a supply of heated water. Water heaters can be used in a number of different residential, commercial, and industrial applications. A water heater can supply hot water to a number of different processes. For example, a hot water heater in a residential dwelling can be used for an automatic clothes washer, an automatic dishwasher, one or more showers, and one or more sink faucets. Every storage-type water heater has a limited capacity, and so when one or more processes use heated water at one time, there may be limited or no heated water available from the storage-type water heater until the water heater has sufficient time to heat more water. Some systems use multiple water heaters to provide a supply of heated water.

SUMMARY

In general, in one aspect, the disclosure relates to a water heating system. The water heating system can include a first tank-based water heater having a first tank, a first heating system, a first inlet line, and a first outlet line, where the first inlet line provides unheated water to the first tank, and where the first outlet line draws heated water from the first tank. The water heating system can also include a first tankless water heater having a second heating system, a second inlet line, and a second outlet line, where the second outlet line of the first tankless water heater provides the heated water to a first heated water demand. The water heating system can further include a first valve that controls an amount of the unheated water flowing through the first inlet line to the first tank-based water heater. The water heating system can also include a controller operatively coupled to the first valve, where the controller controls a position of the first valve to regulate the amount of unheated water flowing to the first tank-based water heater, where the position of the first valve is based on the first heated water demand and a first capacity of the first tankless water heater.

In another aspect, the disclosure can generally relate to a controller. The controller can include a control engine that is configured to receive a request from a heated water demand, and to evaluate the request from the heated water demand relative to a first capacity of heated water of a first tankless water heater. The control engine can also be configured to determine that the first capacity is insufficient to satisfy the request, and to activate a first tank-based water heater to supply an additional heated water quantity to supplement the first capacity of the heated water provided by the first tankless water heater. The control engine can activate the first tank-based water heater, in part, by adjusting a first valve to control a first flow of unheated water into the first tank-based water heater.

In yet another aspect, the disclosure can generally relate to a non-transitory computer-readable medium comprising instructions that, when executed by a hardware processor, perform a method for providing heated water to a heated water demand. The method can include receiving a request for heated water from the heated water demand, and evaluating multiple water heaters in a water heater system. The method can also include adjusting an operation of at least one water heater to satisfy the heated water demand, where adjusting the operation includes adjusting a flow valve for water flowing to a tank-based water heater of the water heaters.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1A:
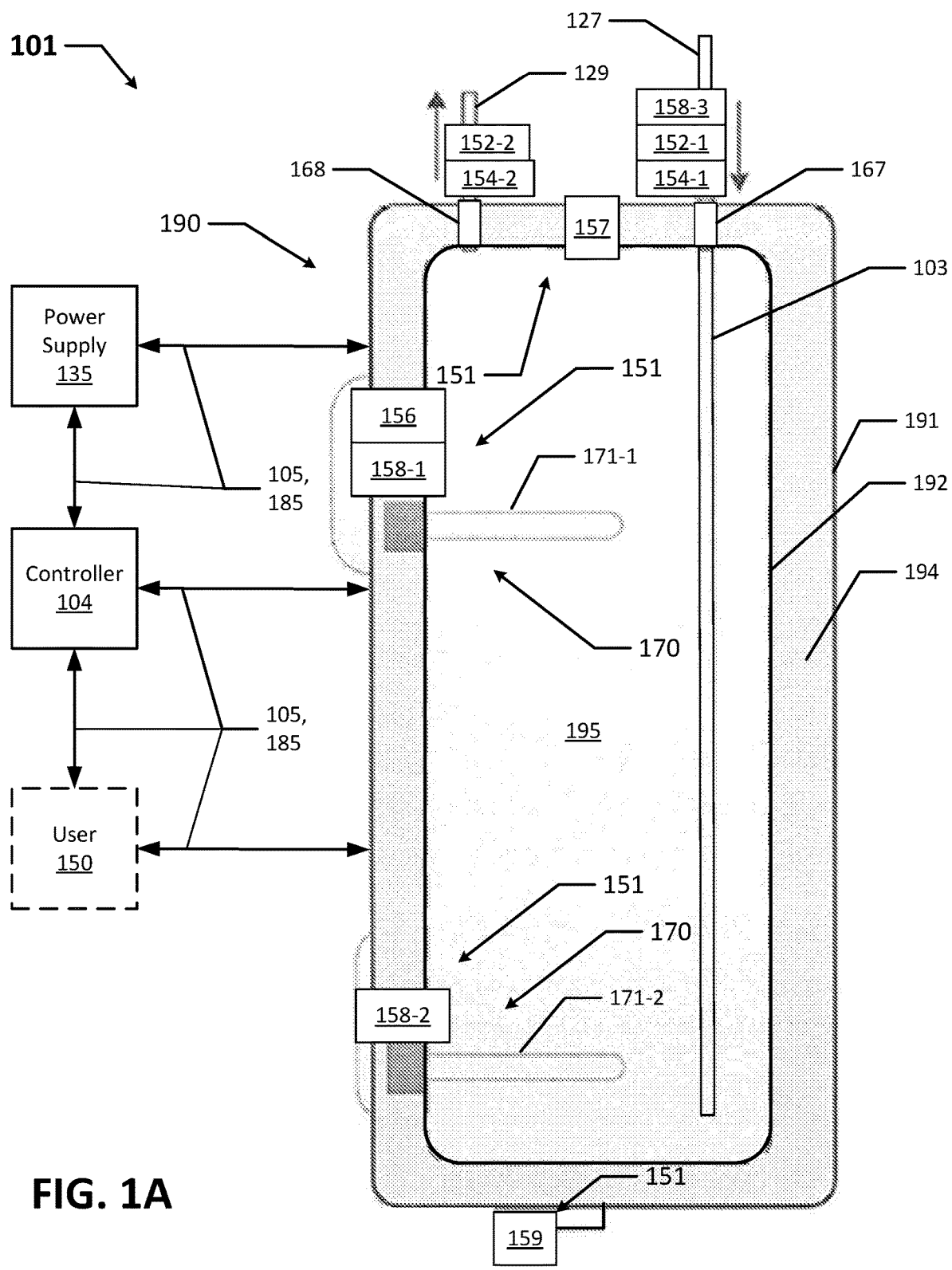
FIGS. 1A and 1B show diagrams of a system that includes a tank-based water heater and a controller in accordance with certain example embodiments.

In general, example embodiments provide systems, methods, and devices for optimizing a water heating system that can include one or more storage-type (also called tank-based herein) water heaters and, in some cases, one or more tankless water heaters. Example embodiments can be used for any number, type, and/or size (e.g., capacity) of water heater. For example, if there are multiple tank-based water heaters, one can be a heat pump water heater, and another can be an electric water heater that uses one or more heating elements. Further, example embodiments can be located in any type of environment (e.g., warehouse, attic, garage, storage, mechanical room, basement) for any type (e.g., commercial, residential, industrial) of user.

Water heaters used with example embodiments can be used for one or more of any number of equipment or systems (e.g., automatic clothes washers, automatic dishwashers, showers, sink faucets, heating systems, humidifiers), which are also called heated water demands. Example embodiments are designed to control the flow of unheated water into one or more tank-based water heaters, or a combination of tankless and tank-based water heaters, as part of a system to provide a quantity of heated water sufficient to meet one or more heated water demands.

Water heater systems (or components thereof, including controllers) described herein can be made of one or more of a number of suitable materials to allow that device and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a water heater system (or portions thereof) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Storage-type water heaters described herein have a rated capacity (also sometimes called a nameplate capacity) and an actual capacity. These capacities are with respect to the tank of the water heater, as described below. In many cases, the actual capacity is less than the rated capacity. For example, a storage-type electric water heater with a rated capacity of 50 gallons can have an actual capacity of 37.5 gallons. The difference between the actual and rated capacity of a water heater can vary based on one or more of a number of factors. For example, for an electric water heater, the actual capacity can be 75% of the nameplate capacity. Example embodiments described herein are directed to the actual capacity of the tank of the storage-type water heater, regardless of whether the water heater uses electricity, gas, or any other form of energy. The actual capacity is the amount of hot water that a tank can hold. The actual capacity can vary based on one or more of a number of factors, including but not limited to the configuration of heating elements, the energy source (e.g., electricity, natural gas) used for the heating system, and the construction of the tank. Similarly, tankless water heaters can have a rated capacity. Such a capacity is usually stated in volume per unit time (e.g., gallons per minute).

In the foregoing figures showing example embodiments of tank-based and tankless water heater systems, one or more of the components shown may be omitted, repeated, and/or substituted. Accordingly, example embodiments of tank-based and tankless water heater systems should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three or four digit number, and corresponding components in other figures have the identical last two digits.

In some cases, example embodiments can be subject to meeting certain standards and/or requirements. Examples of entities that set and/or maintain standards include, but are not limited to, the Department of Energy (DOE), the National Electric Code (NEC), the National Electrical Manufacturers Association (NEMA), the International Electrotechnical Commission (IEC), the American Society of Mechanical Engineers (ASME), the National Fire Protection Association (NFPA), the American Society of Heating, Refrigeration and Air Conditioning Engineers (ASHRAE), Underwriters' Laboratories (UL), and the Institute of Electrical and Electronics Engineers (IEEE). Use of example embodiments described herein meet (and/or allow a corresponding water heater system or portion thereof to meet) such standards when required.

Example embodiments of tank-based and tankless water heater systems will be described more fully hereinafter with reference to the accompanying drawings, in which example embodiments of tank-based and tankless water heater systems are shown. Tank-based and tankless water heater systems may, however, be embodied in many different forms and should not be construed as limited to the example embodiments set forth herein. Rather, these example embodiments are provided so that this disclosure will be thorough and complete, and will fully convey the scope of tank-based and tankless water heater systems to those of ordinary skill in the art. Like, but not necessarily the same, elements (also sometimes called components) in the various figures are denoted by like reference numerals for consistency.

Terms such as "first", "second", "third", "top", "bottom", "side", and "within" are used merely to distinguish one component (or part of a component or state of a component) from another. Such terms are not meant to denote a preference or a particular orientation, and are not meant to limit embodiments of tank-based and tankless water heater systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
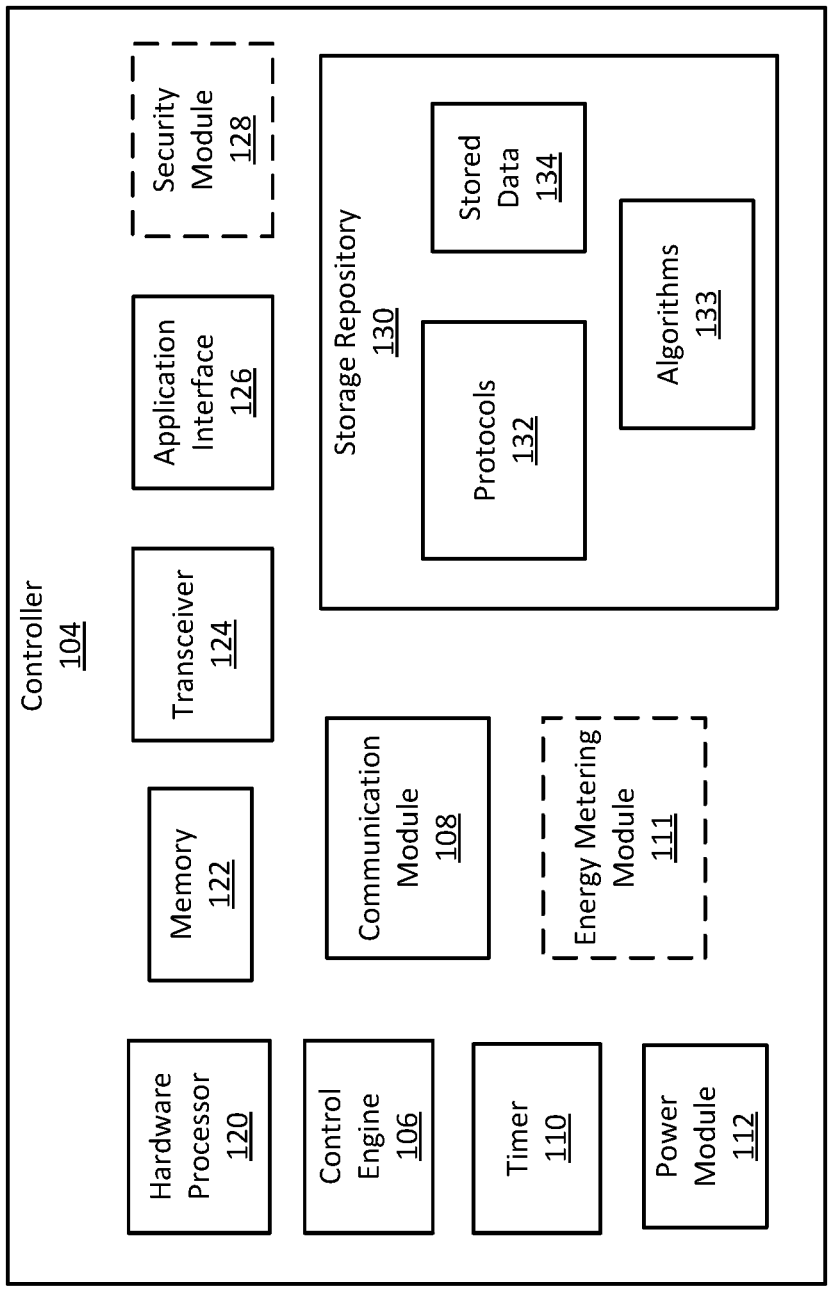

FIGS. 1A and 1B show diagrams of a subsystem 101 of a water heating system that includes a water heater 190 that is controlled by a controller 104 (also called a local controller 104) in accordance with certain example embodiments. Specifically, FIG. 1A shows the water heating subsystem 101, and FIG. 1B shows a detailed system diagram of the controller 104. As shown in FIGS. 1A and 1B, the subsystem 101 can include the water heater 190, the controller 104, an inlet line 127, an outlet line 129, sensors 151, a power supply 135, and an optional user 150. The water heater 190 is shown in a cross-sectional side view in FIG. 1A and can include one or more sensor devices 151 (also sometimes called sensor modules or sensors), a dip tube 103, an inlet fitting 167, an outlet fitting 168, a tank 195, and a heating system 170.

As shown in FIG. 1B, the controller 104 can include one or more of a number of components. Such components, can include, but are not limited to, a control engine 106, a communication module 108, a timer 110, an optional energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example system. Further, one or more components shown in FIGS. 1A and 1B can be rearranged. For example, some or all of the inlet line 127 can be part of the water heater 190. Any component of the example subsystem 101 can be discrete or combined with one or more other components of the subsystem 101.

A user 150 may be any person or entity that interacts with the water heater 190 and/or the controller 104. Examples of a user 150 may include, but are not limited to, an engineer, an appliance or process that uses heated water, an electrician, an instrumentation and controls technician, a mechanic, an operator, a consultant, an electric utility, a grid operator, a retail electric provider, an energy marketing company, load forecasting software, a weather forecasting service, a network manager, a labor scheduling system, a contractor, a homeowner, a landlord, a building management company, and a manufacturer's representative. There can be one or multiple users 150. In some cases, the subsystem can operate without a user 150, making the user 150 optional.

When the subsystem 101 includes a user 150, the user 150 can use a user system (not shown), which may include a display (e.g., a GUI). The user 150 can interact with (e.g., sends data to, receives data from) the controller 104 via the application interface 126 (described below). The user 150 can also interact with the water heater 190 (including any components thereof, including one or more of the sensor devices 151) and/or the power supply 135. Interaction between the user 150, the controller 104, the water heater 190, and the power supply 135 is conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, Zigbee, mobile apps, text/email messages, cellular networking, Bluetooth, WirelessHART, ISA100) technology. For example, a signal transfer link 105 can be (or include) one or more electrical conductors that are coupled to the controller 104 and to a sensor device 151 of the water heater 190. A signal transfer link 105 can transmit signals (e.g., communication signals, control signals, data) between the controller 104, the user 150, the water heater 190 (including components thereof), and/or the power supply 135.

Similarly, a power transfer link 185 can transmit power between the controller 104, the user 150, the water heater 190 (including components thereof), and/or the power supply 135. One or more signal transfer links 105 and/or one or more power transfer links 185 can also transmit signals and power, respectively, between components (e.g., temperature sensor 158-2, flow sensor 154-1, flow sensor 154-2) within the water heater 190 and/or within the controller 104.

The power supply 135 provides power, directly or indirectly, to one or more components (e.g., the sensor devices 151, the controller 104, the heating system 170) of the subsystem 101. The power supply 135 can include one or more components (e.g., a transformer, a fuse) that receives power (for example, through an electrical cable) from an independent power source external to the heating subsystem 101 and generates power of a type (e.g., AC, DC) and level (e.g., 240V, 120V) that can be used by one or more components of the heating subsystem 101. For example, the power supply 135 can provide 240V AC power at a desired frequency. In addition, or in the alternative, the power supply 135 can be a source of power in itself. For example, the power supply 135 can be or include a battery, a localized photovoltaic power system, or some other source of independent power. In certain example embodiments, the power supply 135 delivers 240 VAC or any other required voltage.

As stated above, the water heater 190 in this example includes multiple sensor devices 151, a dip tube 103, an inlet fitting 167, an outlet fitting 168, a tank 195, and a heating system 170. The water heater 190 has an outer wall 191 and an inner wall 192, where the inner wall 192 forms the tank 195. Disposed between the outer wall 191 and the inner wall 192 can be disposed insulation 194 to help the tank 195 to retain heat longer. The inlet fitting 167 can be disposed within the insulation 194 and couple to the inlet line 127 at its top end and to the dip tube 103 at its bottom end. The outlet fitting 168 can also be disposed within the insulation 194 and couple to the outlet line 129 at its top end. In this example, both the inlet fitting 167 and the outlet fitting 168 are disposed at the top end of the water heater 190.

The inlet line 127 can be a pipe or other vessel that delivers unheated water from an external source to the tank 195 of the water heater 190. In some cases, one or more of a number of components (e.g., a flow sensor 154-1, a valve 152-1, a temperature sensor 158-3) can be incorporated into the inlet line 127. One end of the inlet line 127 is coupled, directly or indirectly, to the top end of the inlet fitting 167. The bottom end of the inlet fitting 167 is coupled to the proximal end of the dip tube 103, which is disposed entirely within the water heater 190.

The dip tube 103 can allow for the flow of unheated water into the tank 195 of the water heater 190. The dip tube 103 has a distal end that can be disposed at any point within the tank 195. Typically, as in this case, the distal end of the dip tube 103 is disposed near the bottom end of the tank 195. The top end of the outer wall 191 and the inner wall 192 of the water heater 190 have an aperture in which the inlet fitting 167 can be disposed therein.

Similarly, the outlet line 129 can be a pipe or other vessel that has one end that can be disposed at any point within the tank 195. Typically, as in this case, the distal end of the outlet line 129 is disposed near the top end of the tank 195. The top end of the outer wall 191 and the inner wall 192 of the water heater 190 have an aperture in which the outlet fitting 168 can be disposed. A segment of the outlet line 129 can be coupled to the bottom end of the outlet fitting 168, allowing that segment of the outlet line 129 to extend into the tank 195. In some cases, one or more of a number of components (e.g., a flow sensor 154-2, a valve 152-2) can be incorporated into the outlet line 129. The remainder of the outlet line 129 is coupled to the top end of the outlet fitting 168. This configuration allows heated water in the tank 195 to be drawn from the tank 195 of the water heater 190 so that the heated water can be delivered to a heated water demand (e.g., clothes washer, dishwasher, faucets, shower heads) and/or one or more tankless water heaters, both discussed in more detail below.

Each of the sensor devices 151 can measure one or more of a number of parameters. Examples of types of sensors 151 can include, but are not limited to, temperature sensor, a pressure sensor, a flow rate sensor, a scale, a voltmeter, an ammeter, a power meter, an ohmmeter, an electric power meter, and a resistance temperature detector. A sensor 151 can also include one or more components and/or devices (e.g., a potential transformer, a current transformer, electrical wiring) related to the measurement of a parameter.

A parameter that can be measured by a sensor 151 can include, but is not limited to, pressure, flow rate, current, voltage, power, resistance, weight, and temperature. In some cases, the parameter or parameters measured by a sensor 151 can be used by the controller 104 to perform some action. For example, using parameters measured by a sensor 151, the controller 104 can determine an amount of heated water that is currently available within the tank 195 of the water heater 190 and/or how long it will take for an amount of heated water within the tank 195 of the water heater 190 to become available. Each sensor 151 can use one or more of a number of communication protocols. A sensor 151 can be a stand-alone device or integrated with another component (e.g., the heating system 170) in the subsystem 101. A sensor 151 can measure a parameter continuously, periodically, based on the occurrence of an event, based on a command received from the control engine 106 of the controller 104, and/or based on some other factor.

In this example, there are three temperature sensors 158, at least one flow sensor 154, and a water leak sensor 159. The water leak sensor 159 is disposed toward the bottom end of the water heater 190 and detects a leak in the tank 195 of the water heater 190. In addition, or in the alternative, a water leak sensor 159 can be disposed at any of a number of other locations to detect a water leak. The flow sensor 154-1 measures the rate of flow of unheated water in the inlet line 127 when entering the tank 195. Temperature sensor 158-1 is located toward the top end (e.g., approximately ¼ the height of the tank 195 from the top end of the tank 195) and measures the temperature of the water (e.g., heated water, unheated water, mixture of heated water and unheated water) in the tank 195 at that point. This temperature measured by temperature sensor 158-1 can be an indication of the maximum temperature of the heated water in the tank 195, although, since heat rises, the temperature of the heated water in the tank 195 above the temperature sensor 158-1 is the same or higher than the temperature measured by the temperature sensor 158-1.

Temperature sensor 158-2 is located toward the bottom end (e.g., approximately ¼ the height of the tank 195 from the bottom end of the tank 195) and measures the temperature of the water (e.g., heated water, unheated water, mixture of heated water and unheated water) in the tank 195 at that point. Since heat rises, the temperature measured by temperature sensor 158-2 should be no greater than the temperature measured by the temperature sensor 158-1. If this event occurs, the controller 104 can determine that temperature sensor 158-1 and/or temperature sensor 158-2 may be faulty and require maintenance and/or replacement. Temperature sensor 158-3 measures the temperature of the unheated water in the inlet line 127 before the unheated water flows into the tank 195. The controller 104 uses the measurements made by some or all of these sensors 151 to determine such things as the amount of heated water available in the tank 195 for immediate use and how long it will take for a certain amount of heated water to become available in the tank 195.

The water heater 190 can also include one or more valves 152. In this example, the water heater 190 includes a valve 152-1 that enables control of the rate of flow (or the flow itself) of the unheated water in the inlet tube 127, as well as an optional valve 152-2 that controls the rate of flow (or the flow itself) of heated water in the outlet tube 129. In certain example embodiments, the position (e.g., fully open, fully closed, 30% open) of a valve 152 can be controlled by the controller 104. A valve 152 can be any type of valve used in any of a number of configurations. For example, a valve 152 can be an electric motor operated ball valve that operates with a DC stepper motor.

The water heater 190 can further include a switch 156 (also called an emergency cutout switch 156 or an ECO 156) that controls the energy (e.g., electrical power, gas) delivered to the heating system 170. The switch 156 can have an open position (preventing energy from flowing to the heating system 170) and a closed position (allowing energy to flow to the heating system 170). In some cases, the position and operation of the switch 156 is independent of the controller 104. Alternatively, the switch 156 can be integrated with the controller 104.

The water heater 190 can also include a temperature and pressure relief valve 157 that is disposed in the top of the tank 195, the top of the outer wall 191, and the insulation disposed therebetween. The relief valve 157 can be a purely mechanical device (e.g., not controlled by the controller 104) that detects when the pressure and/or temperature within the tank 195 exceeds a threshold value for that parameter. If such an event were to occur, the relief valve 157 would operate from a normally-closed position to an open position.

If the relief valve 157 determines that the pressure within the tank 195 exceeds a maximum threshold value, then the relief valve 157 opens to allow the excess pressure to vent out the top of the water heater 190 into the ambient environment. In some cases, the controller 104 can make this determination. When the pressure within the tank 195 measured by the relief valve 157 falls back within a safe range (another threshold value), then the relief valve 157 returns to the closed position. Similarly, if the relief valve 157 determines that the temperature within the tank 195 exceeds a maximum threshold value, then the relief valve 157 opens to allow the excess energy to bleed off of the water heater 190 into the ambient environment. Again, in some cases, the controller 104 can make this determination. When the temperature within the tank 195 measured by the relief valve 157 falls back within a safe range (another threshold value), then the relief valve 157 returns to the closed position.

The heating system 170 of the water heater 190 can include one or more devices (or components thereof) that consume energy (e.g., electricity, natural gas, propane) during operation. An example of such a device or component of the heating system 170 can include the heating elements 171 shown in FIG. 1A. In this case, there are two heating elements 171 that extend toward the center of the tank 195. Heating element 171-1 is located toward the top of the tank 195, for example approximately ⅓ the height of the tank 195 from the top end of the tank 195. Heating element 171-2 is located toward the bottom of the tank 195, for example approximately ⅙ the height of the tank 195 from the bottom end of the tank 195.

Those of ordinary skill in the art will appreciate that heating systems 170 for water heaters 190 can have any of a number of other configurations. In any case, the controller 104 is aware of the devices, components, ratings, positioning, and any other relevant information regarding the heating system 170 relative to the tank 195. In some cases, one or more devices of the heating system 170 can have its own local controller. In such a case, the controller 104 can communicate with the local controller of the heating system 170 using signal transfer links 105 and/or power transfer links 185.

The user 150, the power supply 135, and/or the water heater 190 (including the sensors 151 and a local controller, if any) can interact with the controller 104 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the power supply 135, and/or the water heater 190. The user 150, the power supply 135, and the water heater 190 (including portions thereof) can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 3 below, the controller 104 can include a user interface having one or more of a number of I/O devices 316 (e.g., buzzer, alarm, indicating light, pushbutton).

The controller 104, the user 150, the power supply 135, and/or the water heater 190 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system 318 as described below with regard to FIG. 3.

Further, as discussed above, such a system can have corresponding software (e.g., user software, sensor device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the subsystem 101.

The controller 104 can be a stand-alone device or integrated with another component (e.g., the water heater 190) in the subsystem 101. When the controller 104 is a stand-alone device, the controller 104 can include a housing. In such a case, the housing can include at least one wall that forms a cavity. In some cases, the housing can be designed to comply with any applicable standards so that the controller 104 can be located in a particular environment (e.g., a hazardous environment, a high temperature environment, a high humidity environment).

The housing of the controller 104 can be used to house one or more components of the controller 104. For example, the controller 104 (which in this case includes the control engine 106, the communication module 108, the timer 110, the optional energy metering module 111, the power module 112, the storage repository 130, the hardware processor 120, the memory 122, the transceiver 124, the application interface 126, and the optional security module 128) can be disposed in a cavity formed by a housing. In alternative embodiments, any one or more of these or other components of the controller 104 can be disposed on a housing and/or remotely from a housing.

The storage repository 130 can be a persistent storage device (or set of devices) that stores software and data used to assist the controller 104 in communicating with the user 150, the power supply 135, and water heater 190 (including components thereof) within the heating subsystem 101. In one or more example embodiments, the storage repository 130 stores one or more protocols 132, algorithms 133, and stored data 134. The protocols 132 can be any procedures (e.g., a series of method steps) and/or other similar operational procedures that the control engine 106 of the controller 104 follows based on certain conditions at a point in time. The protocols 132 can include any of a number of communication protocols that are used to send and/or receive data between the controller 104 and the user 150, the power supply 135, and the water heater 190.

A protocol 132 can be used for wired and/or wireless communication. Examples of a protocol 132 can include, but are not limited to, Econet, Modbus, profibus, Ethernet, and fiberoptic. One or more of the communication protocols can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols can provide a layer of security to the data transferred within the subsystem 101.

The algorithms 133 can be any formulas, logic steps, mathematical models (e.g., load forecasting models, forward energy price model), and/or other suitable means of manipulating and/or processing data. One or more algorithms 133 can be used for a particular protocol 132. As discussed above, the controller 104 uses information (e.g., temperature measurements, flow rate measurements) provided by the sensor devices 151 to generate, using one or more protocols 132 and/or one or more algorithms 133, information related to the availability of heated water in the tank 195 of the water heater 190 to a user 150.

For example, a protocol 132 and/or an algorithm 133 can dictate when a measurement is taken by a sensor device 151 and which particular sensor devices 151 take a measurement at that point in time. As another example, a protocol 132 and/or an algorithm 133 can be used, in conjunction with measurements made by one or more sensor devices 151, by the controller 104 to determine how much heated water is in the tank 195 of the water heater 190 and available for immediate use by a user 150.

As yet another example, a protocol 132 and/or an algorithm 133 can be used by the controller 104 to determine, if the amount of heated water currently in the tank 195 is insufficient for a desired use of the user 150, how long it will take for the proper amount of water in the tank 195 to be heated and ready for use. As still another example, a protocol 132 and/or an algorithm 133 can be used by the controller 104 to suspend and/or resume operation of the heating system 170 for a water heater 190. An algorithm can be used to determine how and when to cycle multiple water heaters in a system in order to meet a heated water demand while also evenly distributing work (e.g., run time, ignition cycles) among the water heaters in the system.

Stored data 134 can be any data associated with the subsystem 101 (including any components thereof), any measurements taken by the sensor devices 151, time measured by the timer 110, adjustments to an algorithm 133, threshold values, user preferences, default values, results of previously run or calculated algorithms 133, and/or any other suitable data. Such data can be any type of data, including but not limited to historical data for the subsystem 101 (including any components thereof, such as the sensor devices 151 and the heating system 170), calculations, adjustments made to calculations based on actual data, and measurements taken by one or more sensor devices 151. The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the power supply 135, and the water heater 190 (including components thereof) in the subsystem 101. More specifically, the control engine 106 sends information to and/or receives information from the storage repository 130 in order to communicate with the user 150, the power supply 135, and the water heater 190. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, the control engine 106 can activate the communication module 108 when the communication module 108 is in "sleep" mode and when the communication module 108 is needed to send data received from another component (e.g., switch 156, a sensor 151, the user 150) in the subsystem 101.

As another example, the control engine 106 can acquire the current time using the timer 110. The timer 110 can enable the controller 104 to control the heating system 170 (including any components thereof). As yet another example, the control engine 106 can direct a sensor 151 to measure a parameter (e.g., temperature, flow rate) and send the measurement by reply to the control engine 106. In certain example embodiments, the controller 104 can communicate with (e.g., provide input to, receive input from) and, in some cases, control a controller of another water heater and/or a network manager in a system.

Figure 3:
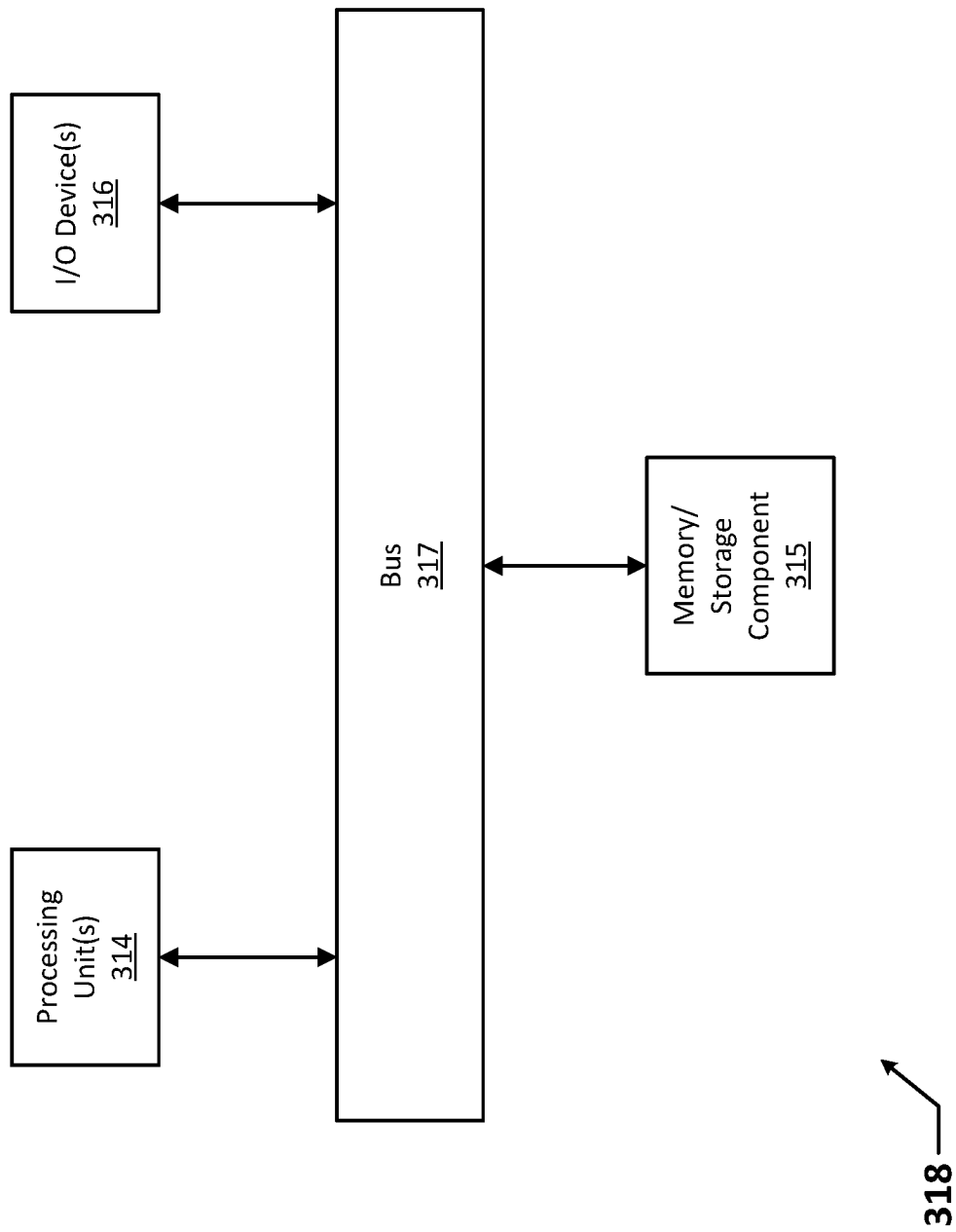
FIG. 3 shows a computing device in accordance with certain example embodiments.
Figure 4:
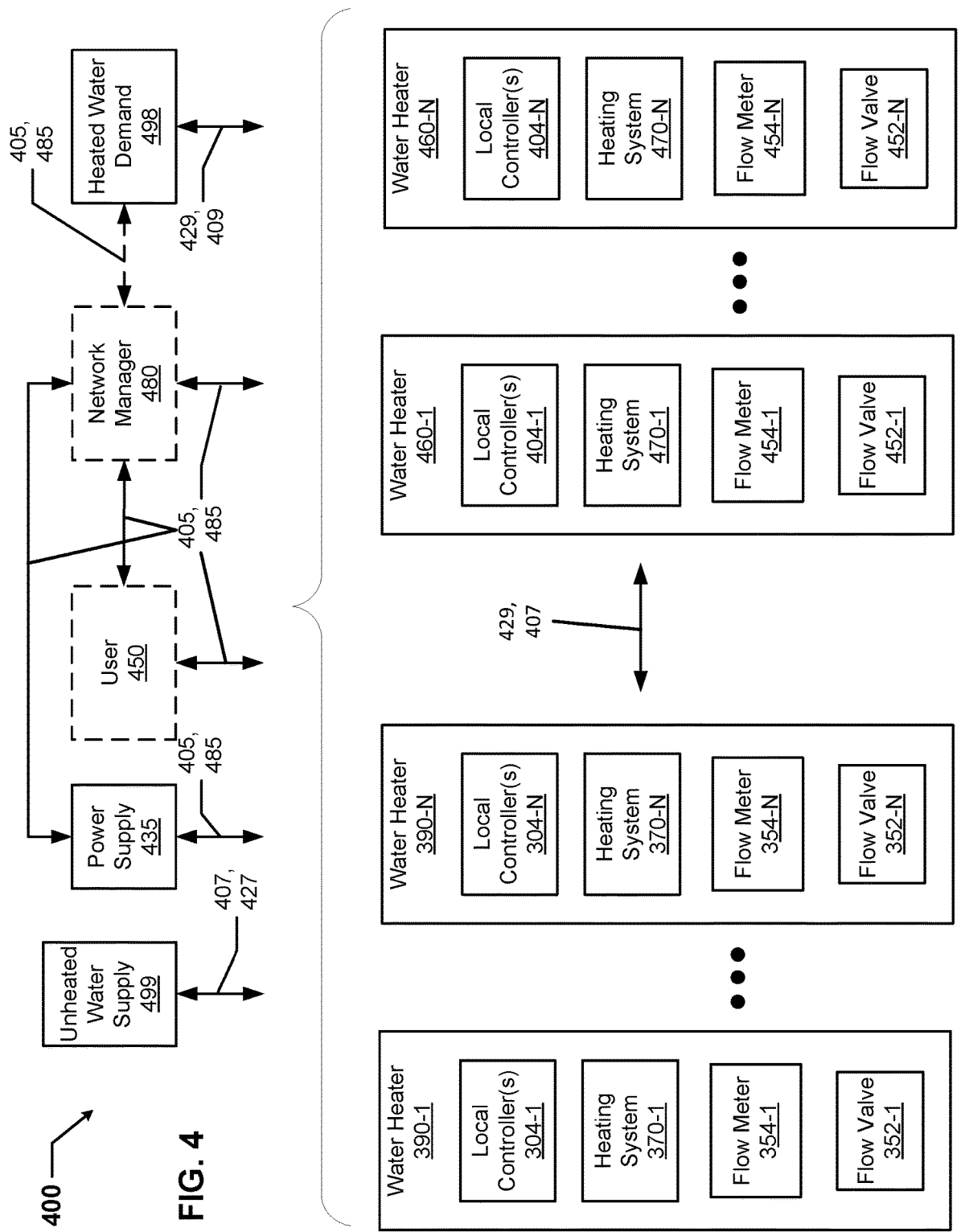
FIG. 4 shows a diagram of a water heating system in accordance with certain example embodiments.

The control engine 106 can be configured to perform a number of functions that help the controller 104 make a determination (an estimate) that relates to the amount of heated water in the tank 195 of the water heater 190 at a particular point in time. For example, the control engine 106 can execute any of the protocols 132 and/or algorithms 133 stored in the storage repository 130 and use the results of those protocols 132 and/or algorithms 133 to communicate to a user 150 an amount of heated water currently available in the tank 195 of the water heater 190. As another example, if there is an insufficient amount of heated water currently available in the tank 195 of the water heater 190, the control engine 106 can execute other protocols 132 and/or algorithms 133 and use the results of those protocols 132 and/or algorithms 133 to communicate to a user 150 how long it will take to achieve some amount of heated water within the tank 195 of the water heater 190. FIGS. 3 and 4 below provide more specific examples of how the control engine 106 functions according to certain example embodiments.

The control engine 106 can generate an alarm or some other form of communication when an operating parameter (e.g., amount of heated water in tank 195 of water heater 190, temperature read by a temperature sensor 158) exceeds or falls below a threshold value (in other words, falls outside an acceptable range of values). The control engine 106 can also track measurements made by a sensor device 151 and determine a possible present or future failure of the sensor device 151 or some other component of the water heater 190 or, more generally, the subsystem 101.

Using one or more algorithms 133, the control engine 106 can predict the expected useful life of these components based on stored data 134, a protocol 132, one or more threshold values, and/or some other factor. The control engine 106 can also measure (using one or more sensors 151) and analyze the efficiency of the water heater 190 over time. An alarm can be generated by the control engine 106 when the efficiency of a component of the subsystem 101 falls below a threshold value, indicating failure of that component.

If the control engine 106 determines there is an insufficient amount of heated water within the tank 195 of the water heater 190, the control engine 106 can control one or more components (e.g., the heating system 170, a valve 152) to get the amount of heated water within the tank 195 of the water heater 190 to within an acceptable range of values (e.g., default values, user-selected values).

The control engine 106 can perform its evaluation functions and resulting actions on a continuous basis, periodically, during certain time intervals, or randomly. Further, the control engine 106 can perform this evaluation for the present time or for a period of time in the future. For example, the control engine 106 can perform forecasts to determine the volume of heated water that will be in the tank 195 of the water heater 190 after a specified period of time. The control engine 106 can adjust a forecast (e.g., every hour, when new information from a user 150 or a sensor device 151 is received).

The control engine 106 can provide power, control, communication, and/or other similar signals to the user 150, the power supply 135, and the water heater 190 (including components thereof). Similarly, the control engine 106 can receive power, control, communication, and/or other similar signals from the user 150, the power supply 135, and the water heater 190. The control engine 106 can control each sensor 151, valve 152, and/or other component in the subsystem 101 automatically (for example, based on one or more algorithms 133 stored in the storage repository 130) and/or based on power, control, communication, and/or other similar signals received from another device through a signal transfer link 105 and/or a power transfer link 185. The control engine 106 may include a printed circuit board, upon which the hardware processor 120 and/or one or more discrete components of the controller 104 are positioned.

In certain embodiments, the control engine 106 of the controller 104 can communicate with one or more components (e.g., a network manager) of a system external to the subsystem 101. For example, the control engine 106 can interact with an inventory management system by ordering a component (e.g., a sensor device 151) to replace a sensor device 151 (e.g., temperature sensor 158-3) that the control engine 106 has determined has failed or is failing. As another example, the control engine 106 can interact with a workforce scheduling system by scheduling a maintenance crew to repair or replace a component of the subsystem 101 when the control engine 106 determines that the component requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., a user 150, a switch 156) of the subsystem 101. For example, if a user 150 operates under IEC Standard 62386, then the user 150 can have a serial communication interface that will transfer data (e.g., stored data 134) measured by the sensors 151. In such a case, the control engine 106 can also include a serial interface to enable communication with the user 150. Such an interface can operate in conjunction with, or independently of, the protocols 132 used to communicate between the controller 104 and the user 150, the power supply 135, and the water heater 190 (or components thereof).

The control engine 106 (or other components of the controller 104) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit ($I^2C$), and a pulse width modulator (PWM).

The communication module 108 of the controller 104 implements the communication protocol (e.g., from the protocols 132 of the storage repository 130) that is used when the control engine 106 communicates with (e.g., sends signals to, receives signals from) the user 150, the power supply 135, and the water heater 190 (or components thereof). In some cases, the communication module 108 accesses the stored data 134 to determine which communication protocol is used to communicate with a sensor 151 associated with certain stored data 134. In addition, the communication module 108 can interpret the communication protocol of a communication received by the controller 104 so that the control engine 106 can interpret the communication.

The communication module 108 can send and receive data between the power supply 135, the water heater 190 (or components thereof), and/or the users 150 and the controller 104. The communication module 108 can send and/or receive data in a given format that follows a particular protocol 132. The control engine 106 can interpret the data packet received from the communication module 108 using the protocol 132 information stored in the storage repository 130. The communication module 108 can also facilitate the data transfer between the control engine 106, the water heater 190 (or components thereof), the power supply 135, and a user 150 by converting the data into a format understood by the recipient of the data.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The power module 112 of the controller 104 provides power to one or more other components (e.g., timer 110, control engine 106) of the controller 104. In addition, in certain example embodiments, the power module 112 can provide power to one or more components (e.g., the heating system 170 of the water heater 190, the switch 156, a valve 152) of the subsystem 101. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown and separate from the power metering module 111) to measure one or more elements of power that flows into, out of, and/or within the controller 104.

The power module 112 can include one or more components (e.g., a transformer, a diode bridge, an inverter, a converter) that receives power (for example, through an electrical cable) from the power supply 135 and generates power of a type (e.g., AC, DC) and level (e.g., 12V, 24V, 120V) that can be used by the other components of the controller 104 and/or by the water heater 190. For example, 240 VAC received from the power supply 135 by the power module 112 can be converted to 12 VDC by the power module 112. In some cases, the power module 112 can use a closed control loop to maintain a preconfigured voltage or current with a tight tolerance at the output. The power module 112 can also protect the remainder of the electronics (e.g., hardware processor 120, transceiver 124) in the controller 104 from surges generated in the line.

In addition, or in the alternative, the power module 112 can be a source of power in itself to provide signals to the other components of the controller 104. For example, the power module 112 can be a battery. As another example, the power module 112 can be a localized photovoltaic power system. In certain example embodiments, the power module 112 of the controller 104 can also provide power and/or control signals, directly or indirectly, to one or more of the sensor devices 151. In such a case, the control engine 106 can direct the power generated by the power module 112 to one or more of the sensor devices 151. In this way, power can be conserved by sending power to the sensor devices 151 when those devices need power, as determined by the control engine 106.

The optional energy metering module 111 of the controller 104 can measure one or more components of power (e.g., current, voltage, resistance, VARs, watts) at one or more points (e.g., output of the power supply 135) associated with the subsystem 101. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. If there is no energy metering module 111, then the controller 104 can estimate one or more components of power using one or more algorithms 133.

The hardware processor 120 of the controller 104 executes software, algorithms 133, and firmware in accordance with one or more example embodiments. Specifically, the hardware processor 120 can execute software on the control engine 106 or any other portion of the controller 104, as well as software used by the user 150, the power supply 135, and the water heater 190 (or portions thereof). The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the power supply 135, and the water heater 190 (or portions thereof). The transceiver 124 can use wired and/or wireless technology. The transceiver 124 can be configured in such a way that the control and/or communication signals sent and/or received by the transceiver 124 can be received and/or sent by another transceiver that is part of the user 150, the power supply 135, and the water heater 190 (or portions thereof). The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, Zigbee, mobile apps, text/email messages, cellular networking, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for the user 150, the power supply 135, and the water heater 190 (or portions thereof) can be part of the stored data 134 (or similar areas) of the storage repository 130.

Optionally, in one or more example embodiments, the security module 128 secures interactions between the controller 104, the user 150, the power supply 135, and the water heater 190 (or portions thereof). More specifically, the security module 128 authenticates communication from software based on security keys verifying the identity of the source of the communication. For example, user software may be associated with a security key enabling the software of the user 150 to interact with the controller 104 and/or the sensors 151. Further, the security module 128 can restrict receipt of information, requests for information, and/or access to information in some example embodiments.

The heating system 170 of FIG. 1 is only one example of how such a system can be configured for a tank-based water heater 190. A number of other components and/or configurations of a heating system 170, whether now known or developed in the future, can be used for a tank-based water heater 190 in example systems. Similarly, the components and/or configurations of the remainder of the tank-based water heater 190, whether now known or developed in the future, can be used in example systems.

For example, a tank-based water heater 190 can be a gas high efficiency (GHE)-type water heater. In such a case, the heating system 170 of the water heater 190 can include a top-fired, fully condensing, gas (e.g., natural gas, LP) burning system. In some cases, the heating system 170 can have a 3 pass heat exchanger and uses various sensors to monitor and control the operation of the unit. In some cases, the modulating combustion operation of the heating system 170 can include a negative pressure venturi style gas valve, a variable speed air moving device, a flame sensor, an ignitor, and a burner assembly.

The sensor devices 151 of such a water heater can include, but are not limited to, a gas pressure sensor, an intake pressure sensor (e.g., indicating whether negative pressure exists in the inlet plenum, or whether the inlet is blocked), an inlet pressure sensor (e.g., indicating whether the air moving device is operating), an exhaust pressure sensor (e.g., indicating whether high pressure exists in the exhaust duct, or whether the exhaust duct is blocked), an upper thermistor 158-1 (e.g., measuring temperature of heated water), a lower thermistor 158-2 (e.g., measuring temperature of unheated water), an exhaust air thermistor (e.g., measuring exhaust gas temperature), a flow sensor (e.g., measuring water use), a flame sensor (e.g., indicating whether the ignitor is operating), an anode (e.g., measuring galvanic potential as an indication of corrosion protection status of the tank 195), and leak sensor 159. Such a water heater 190 can also include a flow sensor 154-1 and a valve 152-1 for unheated water flowing through the inlet line 127.

Figure 2:
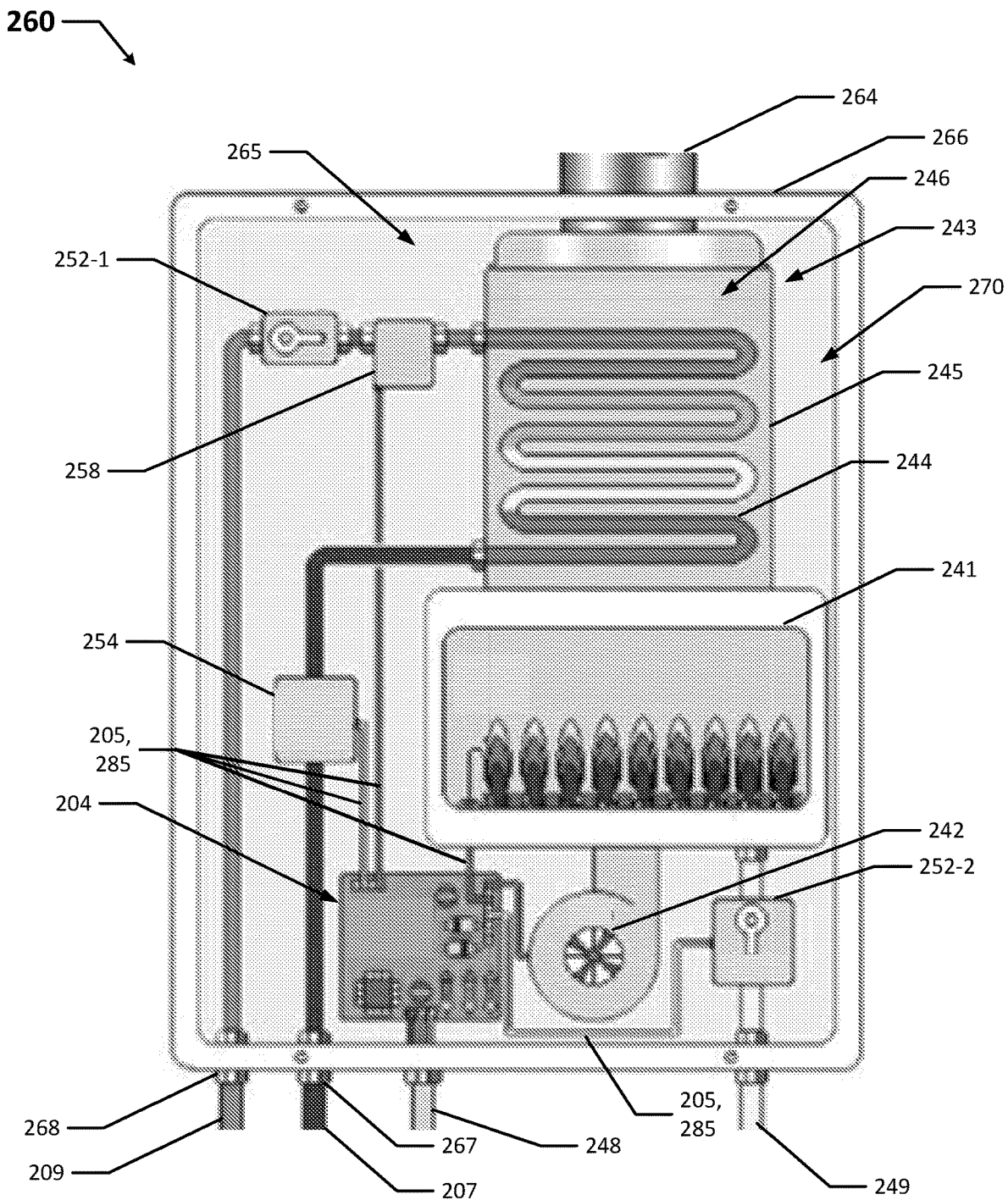
FIG. 2 shows a diagram of a tankless water heater in accordance with certain example embodiments.

FIG. 2 shows a diagram of a tankless water heater 260 in accordance with certain example embodiments. Referring to FIGS. 1A-2, the tankless water heater 260 of FIG. 2 can have a number of features and/or components that are substantially similar to the tank-based water heater 190 of FIGS. 1A and 1B. For example, the tankless water heater 260 of FIG. 2 can include a controller 204, an inlet tube 207, an outlet tube 209, an inlet fitting 267, an outlet fitting 268, a flow sensor 254, a temperature sensor 258, multiple valves 252 (in this case, valve 252-1 and valve 252-2), multiple signal transfer links 205, and multiple power transfer links 285, which can be substantially similar to the corresponding components of the tank-based water heater 190 of FIGS. 1A and 1B. Some of the signal transfer links 205 and the power transfer links 285 are delivered to the water heater 260 by a conduit 248, and a fuel (e.g., natural gas, propane) is delivered to the ignitor 241 through the valve 252-2 using a pipe 249.

However, the heating system 270 of the water heater 260 of FIG. 2 differs from the heating system 170 of the water heater 190 of FIGS. 1A and 1B. In this case, the heating system 270 includes an ignitor 241 (also sometimes called a burner 241), an air moving device 242, a heat exchanger 243, and a vent 264. One or more of the components of the heating system 270 can be controlled by the controller 204. The ignitor 241 of the heating system 270 can be a flame or other source of heat that is ignited or otherwise initiated when a demand for heated water (as determined by the control module 204) is detected.

The air moving device 242 can be used to direct the heat generated by the ignitor 241 toward the heat exchanger 243. The air moving device 242 can be a fan, a blower, and/or any other device that can force the heat generated by the ignitor 241 toward the heat exchanger 243. Specifically, in this case, the air moving device 242 forces the heat generated by the ignitor 241 into the cavity 246 of the heat exchanger 243. The air moving device 242 can have one or more discrete speeds, or can have variable speeds. The air moving device 242 can operate when the ignitor operates. The air moving device 242 can be controlled automatically or by the controller 204.

The heat exchanger 243 can include one or more coils 244 that form a shape (e.g., serpentine, helical) throughout some or all of a cavity 246 formed by one or more walls 245 of the heat exchanger 243. Regardless of the configuration, the coil 244 is designed to have a large surface area that is exposed to the heat generated by the ignitor 241 as the heat passes over the coil 244. The coil 244 can be made of a thermally conductive material (e.g., aluminum, copper) so that the heat can be absorbed by the coil 244. The heat exchanger 243 can also include a vent 264 that extends through the top of the heat exchanger 243 and the top wall 266 of the water heater 260. The vent 264 allows exhaust from the ignitor 241 to be safely disbursed into the ambient environment. The heat exchanger 243, as well as the other components of the tankless water heater 260, can be disposed within a cavity 265 formed by the one or more walls 266 of the water heater 260.

The coil 244 is filled with water that is circulated therethrough. One end of the coil 244 is coupled to the inlet tube 207, thereby receiving unheated water. As the water circulates through the coil 244, it continues to absorb the heat absorbed from the ignitor 241 by the coil 244. The water in the coil 244 can be circulated using a pump, gravity, pressure differentials, and/or any other method for circulating water. When the water reaches the other end of the coil 244 of the heat exchanger 243, the water has absorbed enough heat to become heated water. The other end of the coil 244 of the heat exchanger 243 is coupled to the outlet tube 209, which delivers the heated water to a heated water demand and/or another water heater, as discussed below.

The heating system 270 of FIG. 2 is only one example of how such a system can be configured for a tankless water heater 260. A number of other components and/or configurations of a heating system 270, whether now known or developed in the future, can be used for a tankless water heater 260 in example systems. Similarly, the components and/or configurations of the remainder of the tankless water heater 260, whether now known or developed in the future, can be used in example systems.

FIG. 3 illustrates one embodiment of a computing device 318 that implements one or more of the various techniques described herein, and which is representative, in whole or in part, of the elements described herein pursuant to certain example embodiments. For example, the computing device 318 can be implemented with controller 104 or controller 204 described previously or controllers 304 and 404 described below. Computing device 318 is one example of a computing device and is not intended to suggest any limitation as to scope of use or functionality of the computing device and/or its possible architectures. Neither should computing device 318 be interpreted as having any dependency or requirement relating to any one or combination of components illustrated in the example computing device 318.

Computing device 318 includes one or more processors or processing units 314, one or more memory/storage components 315, one or more input/output (I/O) devices 316, and a bus 317 that allows the various components and devices to communicate with one another. Bus 317 represents one or more of any of several types of bus structures, including a memory bus or memory controller, a peripheral bus, an accelerated graphics port, and a processor or local bus using any of a variety of bus architectures. Bus 317 includes wired and/or wireless buses.

Memory/storage component 315 represents one or more computer storage media. Memory/storage component 315 includes volatile media (such as random access memory (RAM)) and/or nonvolatile media (such as read only memory (ROM), flash memory, optical disks, magnetic disks, and so forth). Memory/storage component 315 includes fixed media (e.g., RAM, ROM, a fixed hard drive, etc.) as well as removable media (e.g., a flash memory drive, a removable hard drive, an optical disk, and so forth).

One or more I/O devices 316 allow a customer, utility, or other user to enter commands and information to computing device 318, and also allow information to be presented to the customer, utility, or other user and/or other components or devices. Examples of input devices include, but are not limited to, a keyboard, a cursor control device (e.g., a mouse), a microphone, a touchscreen, and a scanner.

Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, or any other medium which is used to store the desired information and which is accessible by a computer.

The computer device 318 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 318 includes at least the minimal processing, input, and/or output means necessary to practice one or more embodiments.

Further, those skilled in the art will appreciate that one or more elements of the aforementioned computer device 318 can be located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

FIG. 4 shows a diagram of a water heating system 400 in accordance with certain example embodiments. Referring to FIGS. 1A-4, the system 400 of FIG. 4 includes an unheated water supply 499, a heated water demand 498, a power supply 435, an optional network manager 480, an optional user 450, one or more tank-based water heaters 390 (e.g., water heater 390-1, water heater 390-N), and one or more optional tankless water heaters 460 (e.g., water heater 460-1, water heater 460-N).

Each tank-based water heater 390 includes a number of components, including but not limited to a local controller 304 (e.g., local controller 304-1, local controller 304-N), a heating system 370 (heating system 370-1, heating system 370-N), a flow meter 354 (flow meter 354-1, flow meter 354-N), and a flow valve 352 (e.g., flow valve 352-1, flow valve 352-N). Similarly, each tankless water heater 460 includes a number of components, including but not limited to a local controller 404 (e.g., local controller 404-1, local controller 404-N), a heating system 470 (e.g., heating system 470-1, heating system 470-N), a flow meter 454 (e.g., flow meter 454-1, flow meter 454-N), and a flow valve 452 (e.g., flow valve 452-1, flow valve 452-N).

The power supply 435, the user 450, the tank-based water heaters 390 (including components thereof, such as the local controller 304, the heating system 370, the flow meter 354, and the flow valve 352), and the tankless water heaters 460 (including components thereof, such as the local controller 404, the heating system 470, the flow meter 454, and the flow valve 452) of FIG. 4 are substantially the same as the corresponding components discussed above with respect to FIGS. 1A-2.

The optional network manager 480 of the system 400 of FIG. 4 is a device or component that controls all or a portion of a communication network that includes the various local controllers 304 of the tank-based water heaters 390 and the various local controllers 404 of the tankless water heaters 460. The network manager 480 can also communicate with the user 450 and the power supply 435. In some cases, the network manager 480 can also communicate with the unheated water supply 499 and the heated water demand 498. Such communications can be facilitated using signal transfer links 405 and/or power transfer links 485, which can be substantially the same as the signal transfer links and the power transfer links discussed above. If there is no network manager 480, one of the local controllers can be established or designated as a manager and serve the role of the network manager 480.

The network manager 480 can be substantially similar to the controllers discussed above. Alternatively, the network manager 480 can include one or more of a number of features in addition to, or altered from, the features of the controllers described above. In addition to direct communication between the network manager 480 and other components (e.g., a user 450) of the system 400, the network manager 480 can facilitate communication between components of the system 400. The network manager 480 can serve to communicate and coordinate with any and all components (or portions thereof) in the system 400. The network manager 480 can ascertain the "health" of all water heaters in the system 400. If a water heater is deemed to have a failed or failing component that affects its operation, the network manager 480 can reduce or eliminate the role of that water heater in a particular operation to serve heated water to the heated water demand 498. In such a case, the network manager 480 can notify a user 450 as to the issue with the faulty water heater. In some cases, the network manager 480 assigns, in real time, a master controller among all of the controllers in the system 400.

The unheated water supply 499 of the system 400 of FIG. 4 can be any one or more sources of water that has not been heated by a tank-based water heater 390 or a tankless water heater 460. Examples of an unheated water supply 499 can include, but are not limited to, a city water supply line, a well, a pond, a lake, and a rain collection vessel. The water from an unheated water supply 499 can, in some cases, be at a temperature that is higher than the heated water in a water heater. The water from the unheated water supply 499 can be transferred to any one or more tank-based water heaters 390 and/or any one or more tankless water heaters 460 using one or more inlet lines 427 and/or one or more inlet lines 407. Water can be transferred from one or more tank-based water heaters 390 to any one or more tankless water heaters 460 using outlet lines 409 and/or outlet lines 429.

The heated water demand 498 of the system 400 of FIG. 4 can be any one or more of any number of equipment or systems (e.g., automatic clothes washers, automatic dishwashers, showers, sink faucets, heating systems, humidifiers, tankless water heaters 460). The water used by a heated water demand 498 can be received from any one or more tank-based water heaters 390 and/or any one or more tankless water heaters 460 using one or more outlet lines 409 and/or one or more outlet lines 429. The inlet lines 427, the outlet lines 429, inlet lines 407, and the outlet lines 409 can be substantially the same as those described above with respect to FIGS. 1A-2.

Manifold operation and configuration of the example system 400 is when multiple water heaters (at least one of which is a tank-based water heater 390) are installed to work collectively providing heated water to satisfy varying demands in a high demand setting (such as a school, hospital, or hotel) for the heated water demand 498. In example embodiments, a system 400 has multiple controllers. These multiple controllers can communicate with each other. At any one time, a controller assumes the role of master controller, allowing that controller to direct one or more other controllers in the system 400.

The establishment of a controller in the system 400 as a master controller can be based on one or more of a number of factors and/or conditions. Such factors and/or conditions can include, but are not limited to, runtime of a water heater, efficiency of a water heater, time, and capacity of a water heater, For example a local controller of the first water heater in the system 400 to turn on when a demand of the heated water demand 498 is initiated can initially be established as the master controller. As additional water heaters in the system 400 turn on, a different controller (e.g., another local controller, the network manager 480) can be established as the master controller.

The manifolding (interconnection) of the various water heaters (e.g., water heater 390, water heater 460) in the example system 400, together with intelligent local controllers (e.g., local controller 304, local controller 404), allows for load sharing and run time equalization, which in turn extends the life of the water heaters and increases output capacity of the system 400. Using the various flow valves (e.g., flow valve 352, flow valve 452) allows for incremental (step) closing of the valve to throttle flow. As discussed above, the tankless water heaters 460 have a flow control valve built in. The tank-based water heaters 390 in an example system 400 have a flow valve (e.g., flow valve 352) installed and controlled by one or more controllers in the system 400. Another component of the manifolding system is the flow sensor (e.g., flow sensor 354). The flow sensor allows a controller to calculate mass flow rate to determine whether a corresponding tank-based water heater 390 can meet the required heated water demand or whether additional water heaters are needed to meet the heated water demand.

FIGS. 5-10 each show a diagram of a particular system in accordance with certain example embodiments. Referring to FIGS. 1A-10, each tank-based water heater of FIGS. 5-10 is substantially the same as the tank-based water heaters discussed above. Further, each tankless water heater of FIGS. 5-10 is substantially the same as the tankless water heaters discussed above. In addition, each of the unheated water supplies and each of the heated water demands of FIGS. 5-10 are substantially the same as the unheated water supplies and the heated water demands discussed above.

Figure 5:
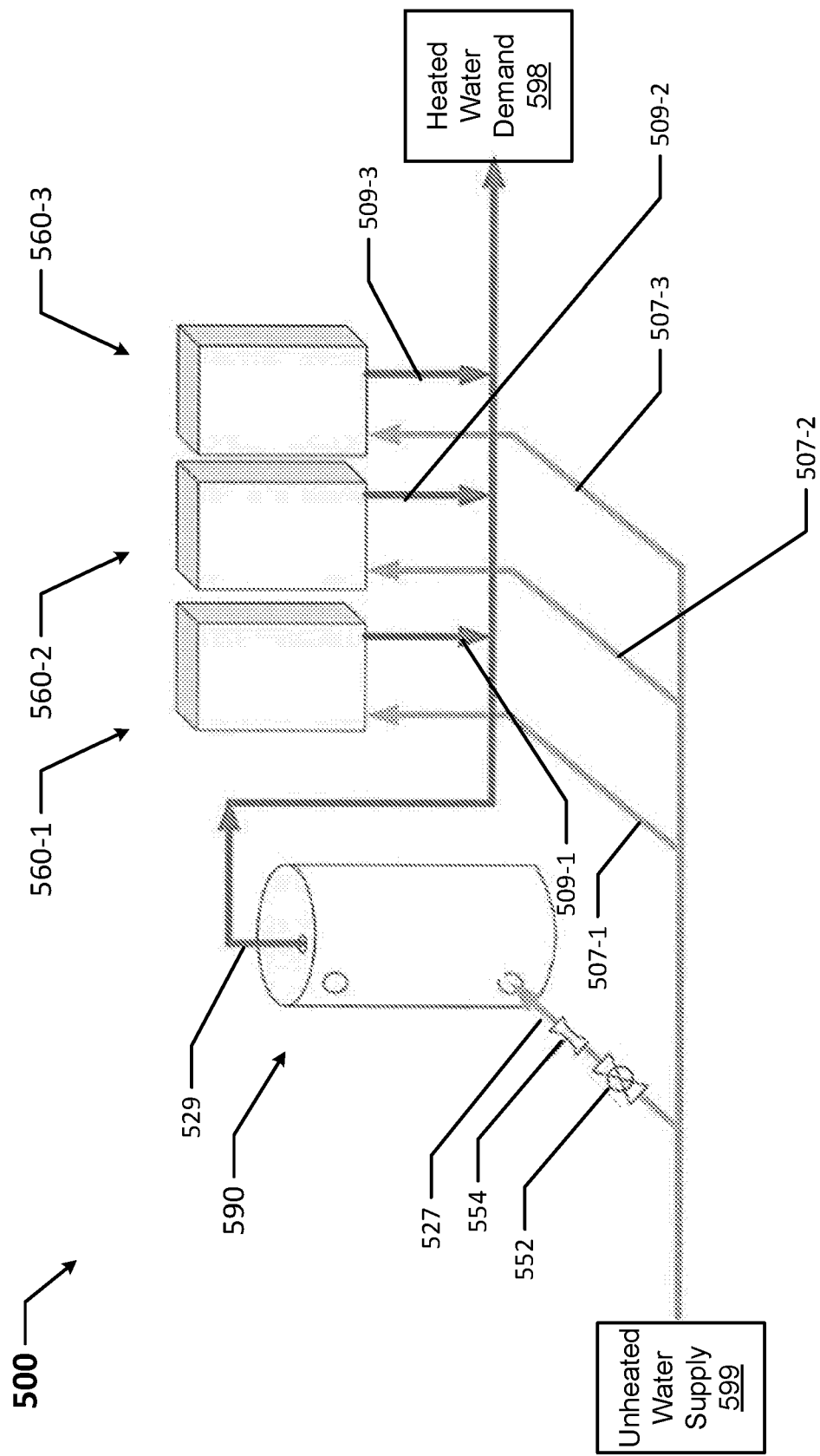
FIGS. 5-10 each show a diagram of a particular system in accordance with certain example embodiments.

The system 500 of FIG. 5 includes a single tank-based water heater 590 and three tankless water heaters 560 (in this case, tankless water heater 560-1, tankless water heater 560-2, and tankless water heater 560-3). This configuration of the system 500 of FIG. 5 is an example of parallel manifolding. Unheated water supply 599 provides unheated water to the tank-based water heater 590 through a flow valve 552, a flow sensor 554, and an inlet line 527. Unheated water supply 599 of FIG. 5 also provides unheated water to tankless water heater 560-1 through inlet line 507-1, tankless water heater 560-2 through inlet line 507-2, and tankless water heater 560-3 through inlet line 507-3.

The tank-based water heater 590 provides heated water to the heated water demand 598 through outlet line 529, and tankless water heater 560-1 provides heated water to the heated water demand 598 through outlet line 509-1. In addition, tankless water heater 560-2 provides heated water to the heated water demand 598 through outlet line 509-2, and tankless water heater 560-3 provides heated water to the heated water demand 598 through outlet line 509-3. In example embodiments, a controller (e.g., the local controller of the tank-based water heater 590, the local controller of tankless water heater 560-3) controls a position of the flow valve 552 to regulate the amount of unheated water that flows to the tank-based water heater 590, which thereby controls the amount of heated water provided by the tank-based water heater 590 to the heated water demand 598. In this way, the tank-based water heater 590 can be used to supplement one or more of the tankless water heaters 560 in providing heated water to the heated water demand 598.

Figure 6:
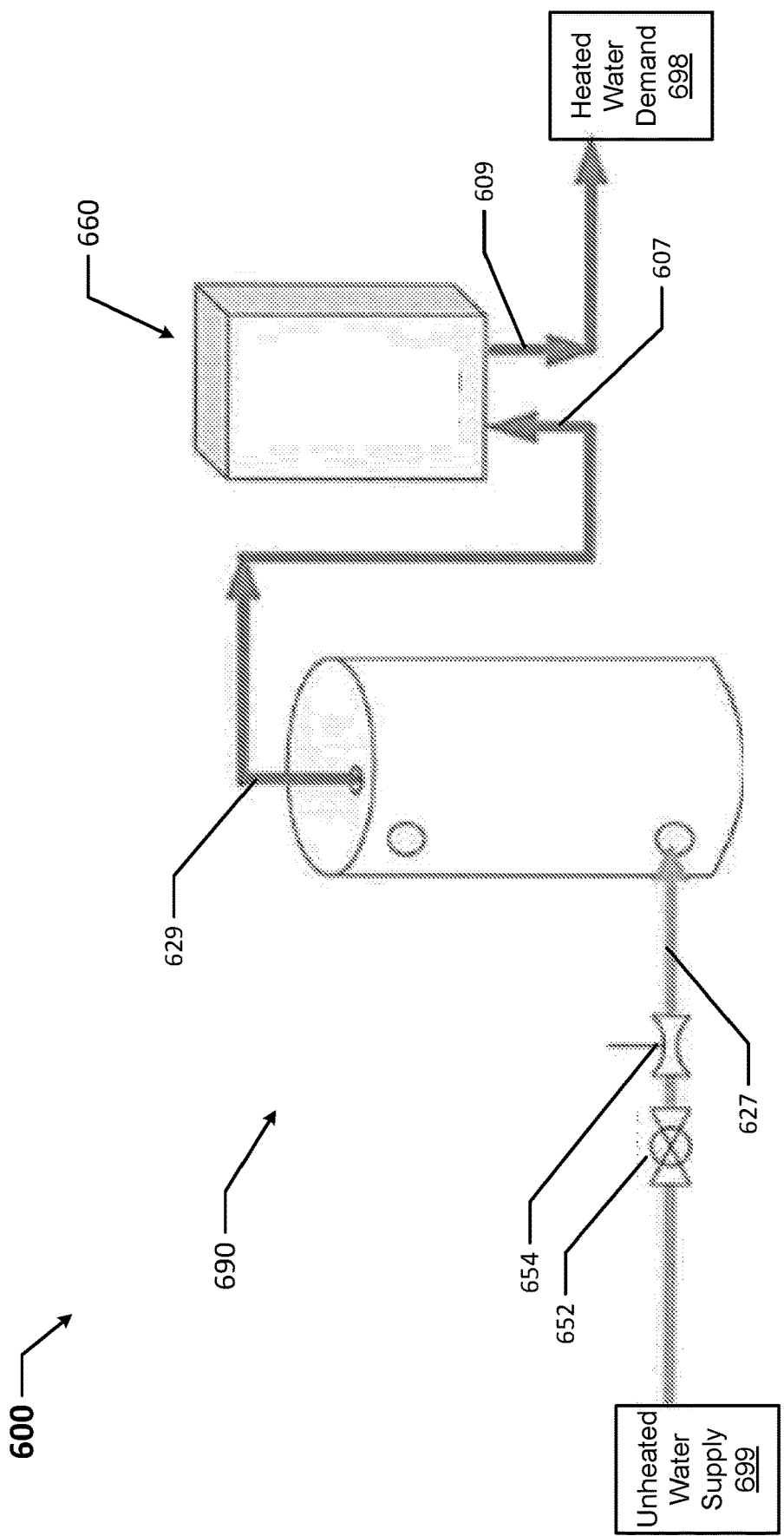

The system 600 of FIG. 6 includes a single tank-based water heater 690 and a single tankless water heater 660. This configuration of the system 600 of FIG. 6 is an example of series manifolding. Series manifolding of tank-based and tankless style water heaters allows the larger capacity tank-based water heaters to act as the primary heat source. With the ability to modulate the firing rate (heat input) of the tank-based water heaters, the temperature of the heated water at the outlet lines of those water heaters can be maintained over a wide range of usage rates. At the point where the tank-based water heater 690 can no longer maintain the desired outlet temperature, the tankless water heater 660 comes on line and maintains the outlet temperature of the heated water at the desired level. The unheated water supply 699 provides unheated water to the tank-based water heater 690 through a flow valve 652, a flow sensor 654, and an inlet line 627. The tank-based water heater 690 uses outlet line 629 to provide heated water to the inlet line 607 of the tankless water heater 660, and tankless water heater 660 provides heated water to the heated water demand 698 through outlet line 609.

In example embodiments, a controller (e.g., the local controller of the tank-based water heater 690, the local controller of tankless water heater 660) controls a position of the flow valve 652 to regulate the amount of unheated water that flows to the tank-based water heater 690, which thereby controls the amount of heated water provided by the tank-based water heater 690 to the tankless water heater 660. In this way, the tank-based water heater 690 can be used to supplement the tankless water heater 660 in providing heated water to the heated water demand 698. In this example, the tank-based water heater 690 can be the sole source of water supply to the tankless water heater 660.

Alternatively, the tank-based water heater 690 can be a supplemental source of water supply to the tankless water heater 660.

Figure 7:
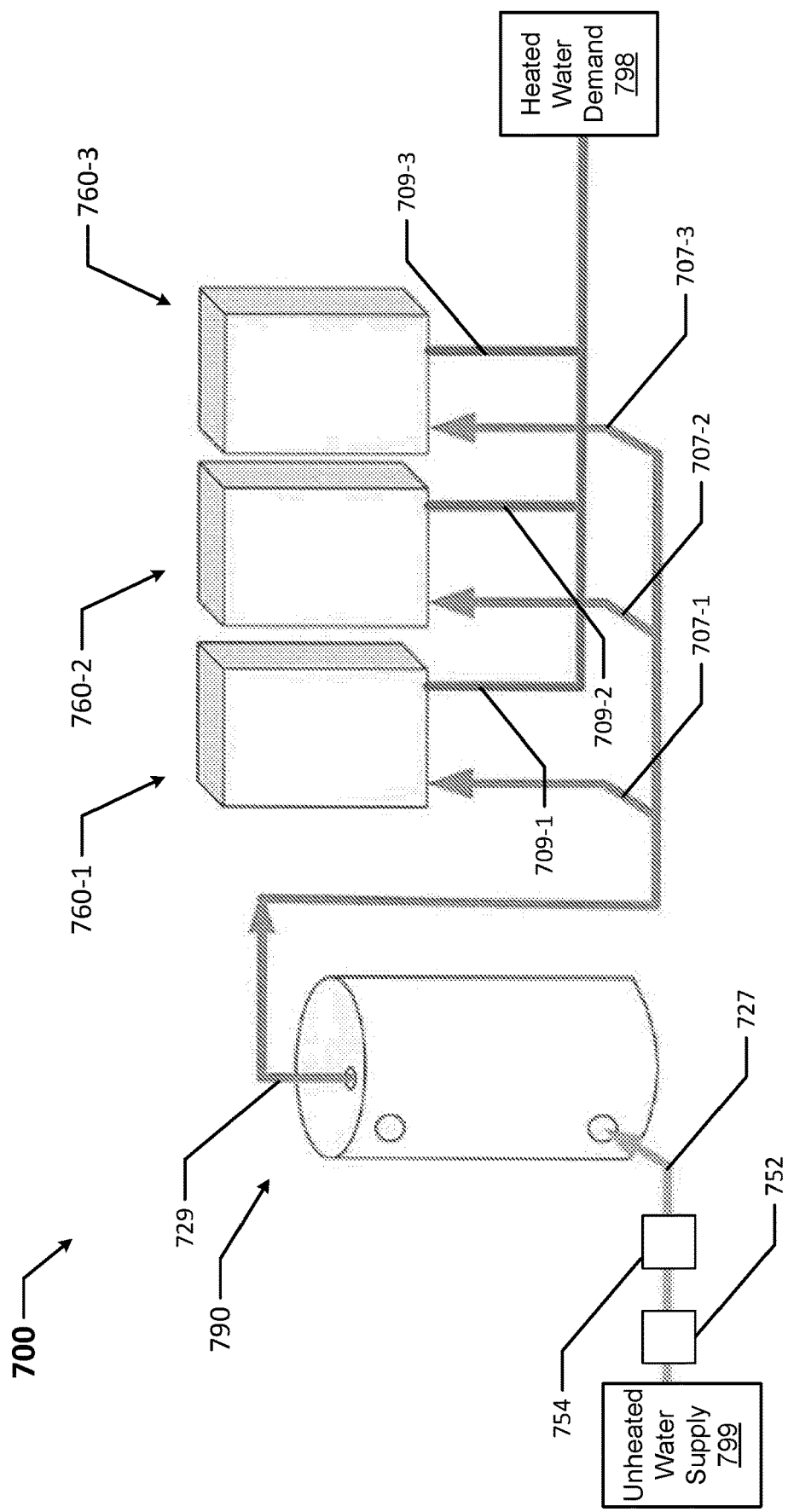

The system 700 of FIG. 7 includes a single tank-based water heater 790 and three tankless water heaters 760 (in this case, tankless water heater 760-1, tankless water heater 760-2, and tankless water heater 760-3). This configuration of the system 700 of FIG. 7 is an example of series/parallel manifolding. Series manifolding of one or more tank-based water heaters 790 with two or more tankless water heaters 760 manifolded in parallel allows the tankless water heaters 760 to serve as the primary means of providing heated water to the heated water demand 798. The tank-based water heater(s) 790 provide reserve capacity for heated water to provide for large surges in demand that the tankless water heaters 760 are unable to handle at a given point in time. When the demand for heated water exceeds the capacity of the tankless water heaters 760, one or more of the tank-based water heaters 790 will turn on to provide the additional heated water required by the heated water demand 798.

This parallel aspect of the configuration of the system 700 allows a controller (e.g, a local controller of a tankless water heater 760, a local controller of a tank-based water heater 790, a network manager 480) to control the heat input of one or more of the tankless water heaters 760. In the case where the system 700 has multiple tankless water heaters 760 and/or tank-based water heaters 790, a controller can equalize run time among those water heaters to promote reliability. The unheated water supply 799 provides unheated water to the tank-based water heater 790 through a flow valve 752, a flow sensor 754, and an inlet line 727.

The tank-based water heater 790 uses outlet line 729 to provide heated water to the inlet line 707-1 of tankless water heater 760-1, to the inlet line 707-2 of tankless water heater 760-2, and to the inlet line 707-3 of tankless water heater 760-3. Subsequently, tankless water heater 760-1 provides heated water to the heated water demand 798 through outlet line 709-1. In addition, tankless water heater 760-2 provides heated water to the heated water demand 798 through outlet line 709-2, and tankless water heater 760-3 provides heated water to the heated water demand 798 through outlet line 709-3.

In example embodiments, a controller (e.g., the local controller of the tank-based water heater 790, the local controller of tankless water heater 760-3) controls a position of the flow valve 752 to regulate the amount of unheated water that flows to the tank-based water heater 790, which thereby controls the amount of heated water provided by the tank-based water heater 790 to one or more of the tankless water heaters 760. In this way, the tank-based water heater 790 can be used to supplement one or more of the tankless water heaters 760 in providing heated water to the heated water demand 798.

Figure 8:
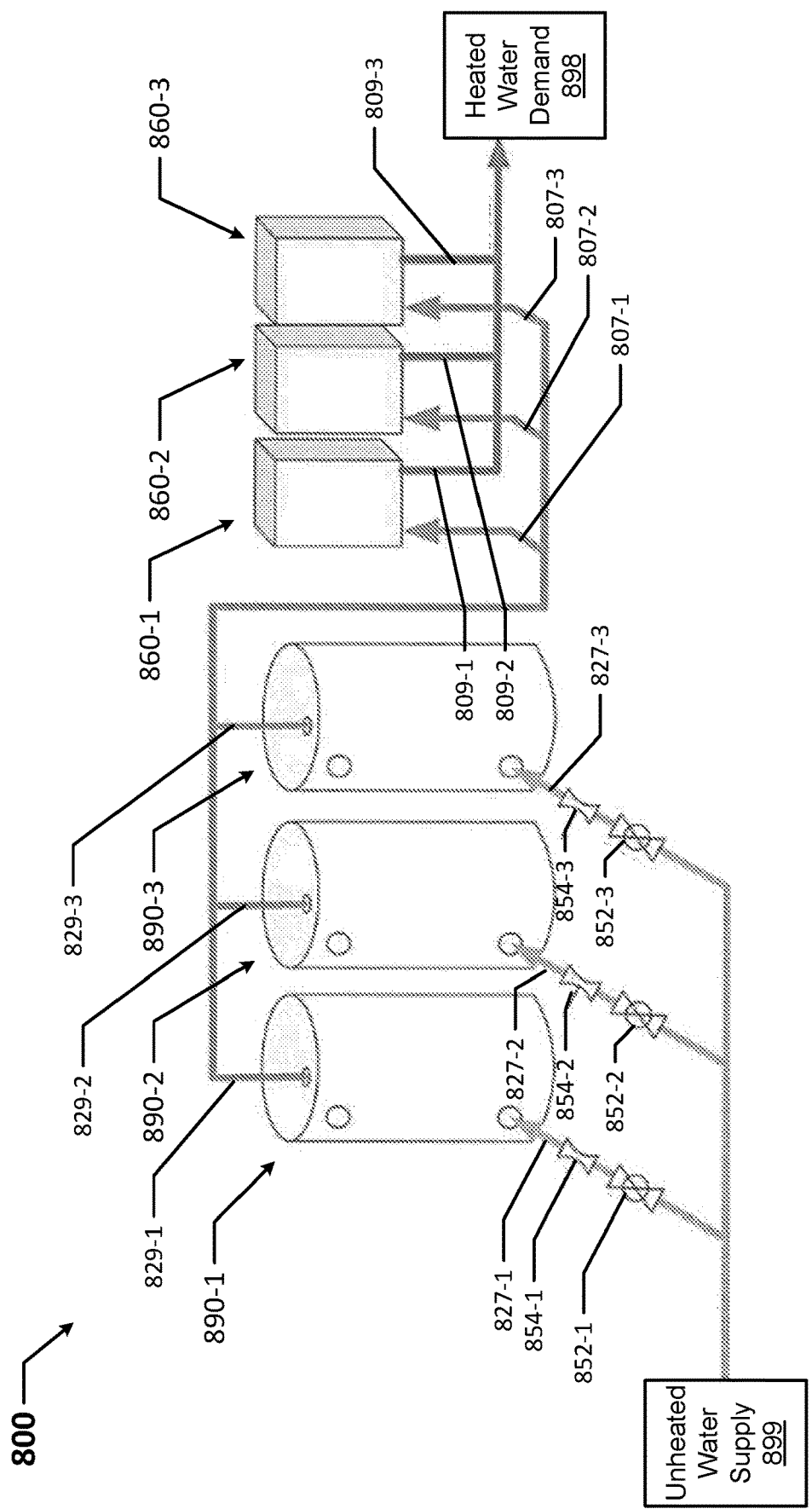

The system 800 of FIG. 8 includes three tank-based water heaters 890 (in this case, tank-based water heater 890-1, tank-based water heater 890-2, and tank-based water heater 890-3) and three tankless water heaters 860 (in this case, tankless water heater 860-1, tankless water heater 860-2, and tankless water heater 860-3). This configuration of the system 800 of FIG. 8 is an example of parallel/series/parallel manifolding. Unheated water supply 899 provides unheated water to tank-based water heater 890-1 through flow valve 852-1, flow sensor 854-1, and inlet line 827-1. Unheated water supply 899 also provides unheated water to tank-based water heater 890-2 through flow valve 852-2, flow sensor 854-2, and inlet line 827-2. In addition, unheated water supply 899 provides unheated water to tank-based water heater 890-3 through flow valve 852-3, flow sensor 854-3, and inlet line 827-3.

Tank-based water heater 890-1 uses outlet line 829-1 to provide heated water to one or more of inlet line 807-1 of tankless water heater 860-1, inlet line 807-2 of tankless water heater 860-2, and inlet line 807-3 of tankless water heater 860-3. In addition, tank-based water heater 890-2 uses outlet line 829-2 to provide heated water to one or more of inlet line 807-1 of tankless water heater 860-1, inlet line 807-2 of tankless water heater 860-2, and inlet line 807-3 of tankless water heater 860-3. Further, tank-based water heater 890-3 uses outlet line 829-3 to provide heated water to one or more of inlet line 807-1 of tankless water heater 860-1, inlet line 807-2 of tankless water heater 860-2, and inlet line 807-3 of tankless water heater 860-3.

Subsequently, tankless water heater 860-1 provides heated water to the heated water demand 898 through outlet line 809-1. In addition, tankless water heater 860-2 provides heated water to the heated water demand 898 through outlet line 809-2, and tankless water heater 860-3 provides heated water to the heated water demand 898 through outlet line 809-3. In example embodiments, a controller (e.g., the local controller of the tank-based water heater 890-2, the local controller of tankless water heater 860-3) controls a position of each of the flow valves 852 to regulate the amount of unheated water that flows to each of the tank-based water heaters 890, which thereby controls the amount of heated water provided by one or more of the tank-based water heaters 890 to one or more of the tankless water heaters 860. In this way, one or more of the tank-based water heaters 890 can be used to supplement one or more of the tankless water heaters 860 in providing heated water to the heated water demand 898.

Figure 9:
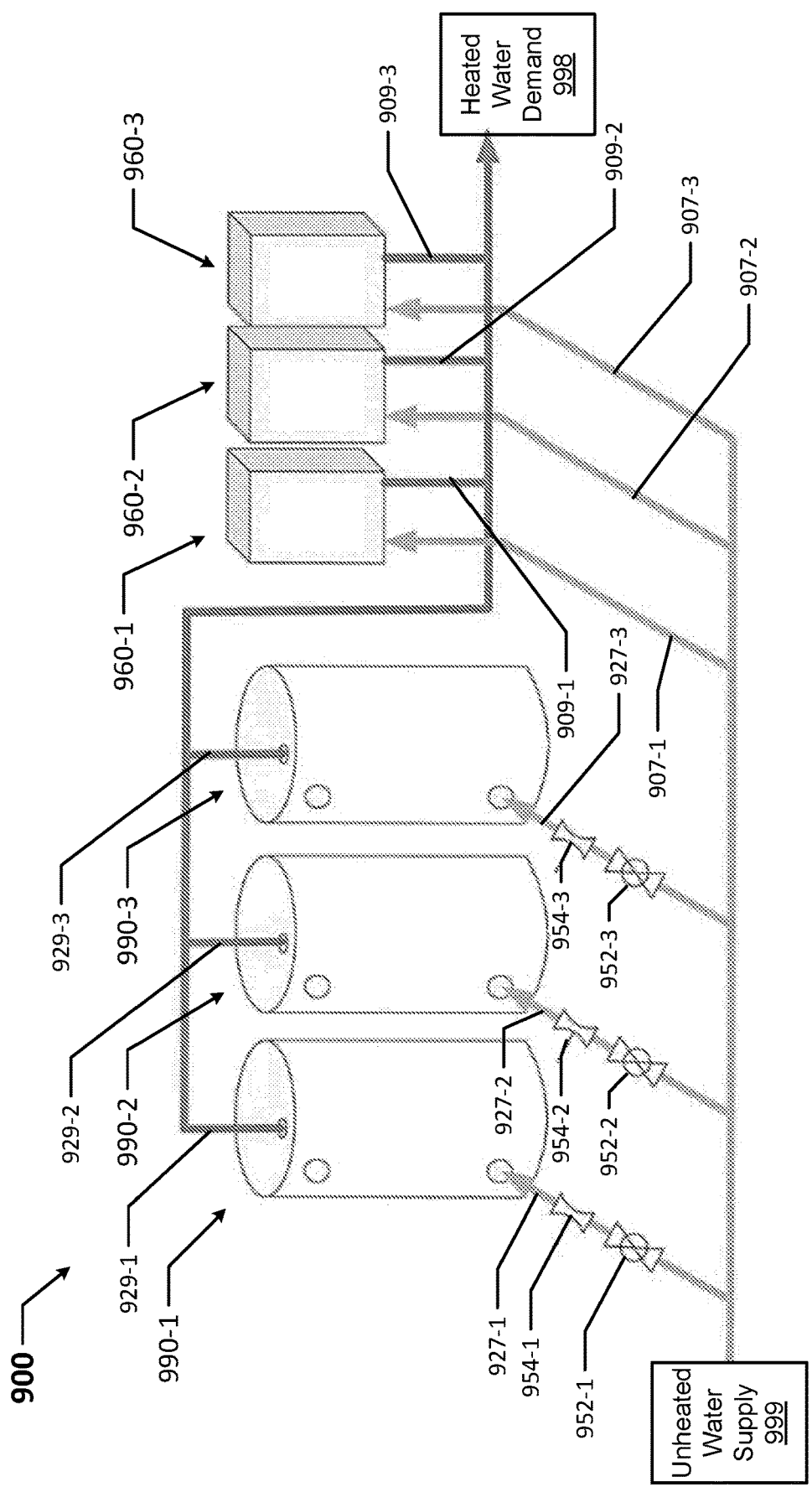

The system 900 of FIG. 9 includes three tank-based water heaters 990 (in this case, tank-based water heater 990-1, tank-based water heater 990-2, and tank-based water heater 990-3) and three tankless water heaters 960 (in this case, tankless water heater 960-1, tankless water heater 960-2, and tankless water heater 960-3). This configuration of the system 900 of FIG. 9 is an example of parallel/parallel manifolding. Unheated water supply 999 provides unheated water to tank-based water heater 990-1 through flow valve 952-1, flow sensor 954-1, and inlet line 927-1. Unheated water supply 999 also provides unheated water to tank-based water heater 990-2 through flow valve 952-2, flow sensor 954-2, and inlet line 927-2.

In addition, unheated water supply 999 provides unheated water to tank-based water heater 990-3 through flow valve 952-3, flow sensor 954-3, and inlet line 927-3. Unheated water supply 999 also provides heated water to inlet line 907-1 of tankless water heater 960-1, inlet line 907-2 of tankless water heater 960-2, and inlet line 907-3 of tankless water heater 960-3. Subsequently, tank-based water heater 990-1 uses outlet line 929-1, tank-based water heater 990-2 uses outlet line 929-2, and tank-based water heater 990-3 uses outlet line 929-3 to provide heated water to the heated water demand 998. Similarly, tankless water heater 960-1 uses outlet line 909-1, tankless water heater 960-2 uses outlet line 909-2, and tankless water heater 960-3 uses outlet line 909-3 to provide heated water to the heated water demand 998.

In example embodiments, a controller (e.g., the local controller of the tank-based water heater 990-2, the local controller of tankless water heater 960-3) controls a position of each of the flow valves 952 to regulate the amount of unheated water that flows to each of the tank-based water heaters 990, which thereby controls the amount of heated water provided by one or more of the tank-based water heaters 990 to one or more of the tankless water heaters 960. In this way, one or more of the tank-based water heaters 990 can be used to supplement one or more of the tankless water heaters 960 in providing heated water to the heated water demand 998.

Figure 10:
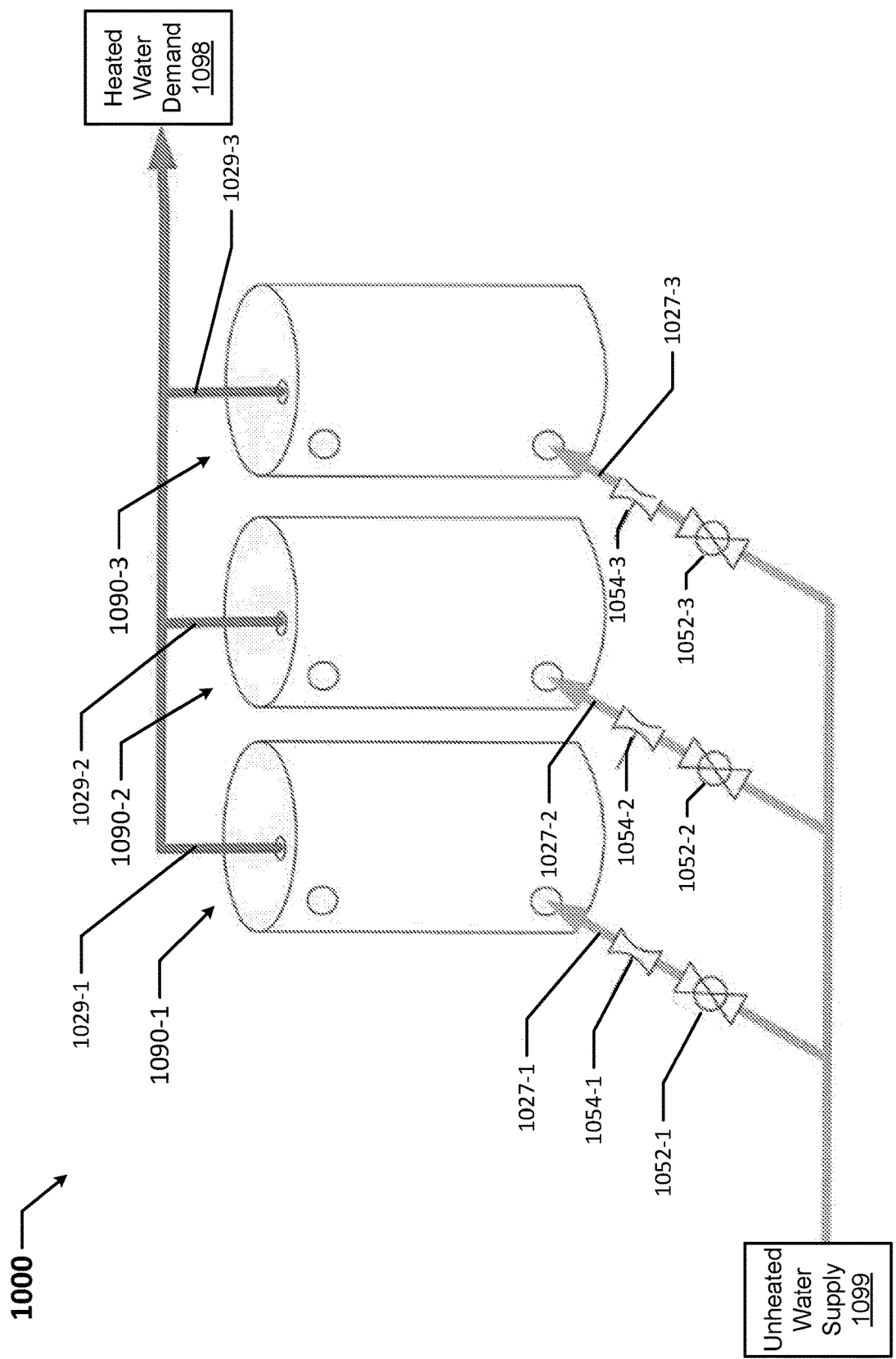

The system 1000 of FIG. 10 includes three tank-based water heaters 1090 (in this case, tank-based water heater 1090-1, tank-based water heater 1090-2, and tank-based water heater 1090-3) and no tankless water heaters. This configuration of the system 1000 of FIG. 10 is an example of parallel manifolding. Unheated water supply 1099 provides unheated water to tank-based water heater 1090-1 through flow valve 1052-1, flow sensor 1054-1, and inlet line 1027-1. Unheated water supply 1099 also provides unheated water to tank-based water heater 1090-2 through flow valve 1052-2, flow sensor 1054-2, and inlet line 1027-2. In addition, unheated water supply 1099 provides unheated water to tank-based water heater 1090-3 through flow valve 1052-3, flow sensor 1054-3, and inlet line 1027-3.

Subsequently, tank-based water heater 1090-1 uses outlet line 1029-1, tank-based water heater 1090-2 uses outlet line 1029-2, and tank-based water heater 1090-3 uses outlet line 1029-3 to provide heated water to the heated water demand 1098, which can include one or more tankless water heaters. In example embodiments, a controller (e.g., the local controller of the tank-based water heater 1090-2, a network manager) controls a position of each of the flow valves 1052 to regulate the amount of unheated water that flows to each of the tank-based water heaters 1090, which thereby controls the amount of heated water provided by one or more of the tank-based water heaters 1090 to the heated water demand 1098. In this way, one or more of the tank-based water heaters 1090 can be used to provide heated water to the heated water demand 1098.

In certain example embodiments, a controller (e.g., the network manager 480, a local controller) can adjust one or more valves in pipes that connect a water heater to one or more other water heaters, the unheated water supply, and/or the heated water demand. In such a case, changing the position of a valve can change the configuration of the manifolding of some or all of the water heaters in the system. For example, by adjusting one or more such valves, a system can be changed from a parallel manifolding configuration to a series manifolding configuration. Such changes can be performed automatically based on one or more algorithms 133 and/or protocols 132 in order to more efficiently meet a request of a heated water demand in a particular situation. Alternatively, such changes can be made, directly or indirectly, based on actions by or instructions from a user 450.

Figure 11:
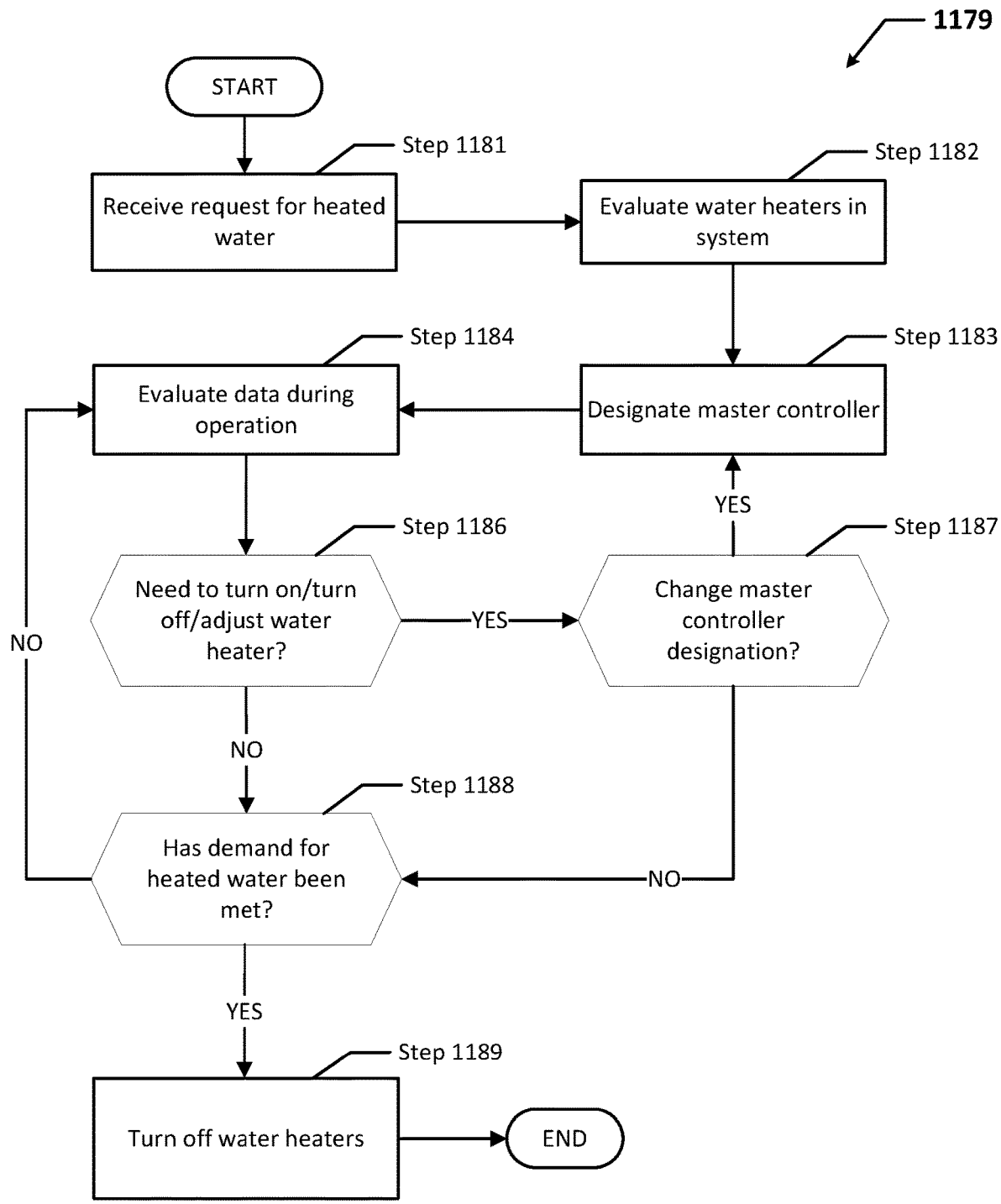
FIG. 11 shows a flowchart for optimizing a water heating system in accordance with certain example embodiments.

FIG. 11 shows a flowchart of a method 1179 for optimizing a water heating system in accordance with certain example embodiments. While the various steps in this flowchart are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of optimizing a water heating system can be a continuous process, and so the START and END steps shown in FIG. 11 can merely denote the start and end of a particular series of steps within a continuous process.

In addition, a person of ordinary skill in the art will appreciate that additional steps not shown in FIG. 11 can be included in performing these methods in certain example embodiments. Accordingly, the specific arrangement of steps should not be construed as limiting the scope. In addition, a particular computing device, as described, for example, in FIG. 3 above, is used to perform one or more of the steps for the methods described below in certain example embodiments. For the methods described below, unless specifically stated otherwise, a description of the controller (e.g., controller 104) performing certain functions can be applied to the control engine (e.g., control engine 106) of the controller.

For clarity, the controller described herein can control other aspects of the system (e.g., system 400) while performing the functions described above and in the methods of FIG. 11 below. For example, the controller can control a heating system (e.g., heating system 170) independently of, or in conjunction with, the functions described herein. In such a case, the heating system can be controlled in one or more of a number of ways. For example, the controller can suspend operation of the heating system until the temperature of the heated water drops below some minimum threshold value (part of the stored data (e.g., stored data 134)), at which point the controller can resume operation of the heating system. This cycle can continue until heated water is drawn from the tank (e.g., tank 195). As another example, the controller can reduce the level of heat generated by the heating system until heated water is drawn from the tank.

Referring to FIGS. 1A-11, the example method 1179 of FIG. 11 begins at the START step and proceeds to step 1181, where a request for heated water is received. The request can be received from a heated water demand (e.g., heated water demand 498). The request can be received by a controller (e.g., local controller 304, local controller 404, network manager 480). The request can be for a specific volume (or range of volumes) of heated water. Alternatively, the request can be a volume of heated water that is based on the heated water demand making the request.

In step 1182, the water heaters (e.g., water heater 390, water heater 460) in the system 400 are evaluated. The water heaters in the system 400 can be evaluated by a controller (e.g., the controller of step 1181) using measurements made by sensor devices 151 in the system 400. For example, the evaluation can be made using a number of temperature readings, flow rate readings, number of ignition cycles of a heating system, health of each water heater in the system 400, and operating hours of each water heater.

In step 1183, a master controller is designated. The master controller can be designated by the controller of step 1181 or step 1182. The designation can be based on one or more protocols 132 and/or algorithms 133. For example, a protocol 132 can dictate that the master controller is the local controller of the first water heater to be operated to meet the demand for heated water. The master controller (also sometimes called a manager controller or a managing controller) has the ability to control all other controllers of all other water heaters (e.g., tankless, tank-based) in the system 400. Once a master controller is designated, the controller of step 1181/1182 or the newly designated master controller can operate one or more water heaters in the system 400 to meet the demand for heated water. The designation of a master controller can change during an operation based on any of a number of factors, including but not limited to capacity of a water heater, location of the heated water demand 498, volume of heated water required by the heated water demand 498, and configuration of the water heaters in the system 400.

In step 1184, data is evaluated during operation of the water heaters to meet the request for heated water. The data can be evaluated by the master controller or some other controller (e.g., the network manager) in the system 400. Some of the data that is evaluated in this step 1184 is the data mentioned in step 1182. In addition, the data that is evaluated in this step 1184 can include, but is not limited to, current demand for heated water relative to the initial request for heated water, equipment failure, and time. In step 1186, a determination is made as to whether a water heater needs to be turned on, turned off, or adjusted. The determination can be made by the master controller or some other controller in the system 400 using one or more protocols 132 and/or algorithms 133 stored in the storage repository 130. The determination can be based on the data evaluated in step 1184.

The determination can be based on one or more of a number of factors. Examples of such factors can include, but are not limited to, current run time of the water heater, cumulative run time of the water heater, maintenance history of the water heater, amount of the heated water demand 498, and the configuration of other water heaters in the system 400 relative to the water heater. For example, the controller may try to cycle water heaters so that all of the water heaters in the system 400 (at least for water heaters of the same type) run for substantially the same number of hours.

The determination can be made for a single water heater, one or more water heaters of a certain type (e.g., tankless, tank-based), or all water heaters in the system 400. For example, the master controller may determine based on accumulated usage data among all the water heaters that one of the water heaters should be turned off in order to more evenly distribute the accumulated usage among the various water heaters in the system. If one or more of the water heaters needs to be turned on, turned off, or adjusted, then a controller (e.g., master controller, network manager 480) sends a communication to the local controller(s) of those water heater(s) to make the appropriate adjustments. Adjusting a water heater can include adjusting a flow valve (e.g., flow valve 352) to control an amount of unheated water that flows to a water heater. If one or more of the water heaters does not need to be turned on, turned off, or adjusted, the process proceeds to step 1188.

In step 1187, a determination is made as to whether a new master controller needs to be designated. The determination can be made by the master controller or some other controller in the system 400 using one or more protocols 132 and/or algorithms 133 stored in the storage repository 130. The determination can be based on the data evaluated in step 1186. If a new master controller needs to be designated, then the process reverts to step 1183. If a new master controller does not need to be designated, then the process proceeds to step 1188.

In step 1188, a determination is made as to whether the demand for heated water has been met. The determination can be made by the master controller or some other controller in the system 400. The determination can be made based on communication with the heated water demand 498. Alternatively, the determination can be made based on an outlet temperature of a water heater or the temperature of the heated water at the heated water demand 498. As another alternative, the determination can be made using one or more protocols 132 and/or algorithms 133 stored in the storage repository 130. If the demand for heated water has been met, then the process proceeds to step 1189. If the demand for heated water has not been met, then the process reverts to step 1184.

In step 1189, the water heaters are turned off, ending the operation. The water heaters can be turned off by the master controller or some other controller in the system 400. Turning off the water heaters can be performed using one or more protocols 132 and/or algorithms 133 stored in the storage repository 130. Once step 1189 is complete, then the method 1179 can end at the END step. Alternatively, when step 1189 is complete, the method 1179 can revert to one of the previously-described steps (e.g., step 1182).

Example embodiments can determine the supply of hot water (also called heated water herein) in a water heater. This determination can be performed in real time for a current amount or a future amount. In the case of determining a future amount, an amount of time may also be estimated using example embodiments. Example embodiments can receive input and/or information from any of a number of sensor devices and/or users to make its determinations. Example embodiments can also provide a determination as to whether there is sufficient heated water for a process that is about to be used by a user. Example embodiments can control various aspects of a water heater to optimize energy efficiency and reduce energy consumption. Example embodiments can also lower costs and increase the useful life of a water heater, including its various components.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A controller comprising:
   one or more processors; and
   memory storing instructions that, when executed by the one or more processors, cause the controller to:
   receive a request for a requested heated water quantity;
   determine, based on at least one flow sensor, that a tankless water heater has a capacity of heated water that is insufficient to satisfy the request; and
   output, based on the determination using the at least one flow sensor that the tankless water heater has a capacity of heated water that is insufficient to satisfy the request, instructions for a first tank-based water heater to supply a first additional heated water quantity to supplement the capacity of heated water.

2. The controller of claim 1, wherein outputting instructions for the first tank-based water heater to supply the first additional heated water quantity comprises:
   outputting instructions for a first valve to permit a first flow of unheated water into the first tank-based water heater.

3. The controller of claim 1, wherein the controller is in communication with at least one of a local controller of the tankless water heater and a local controller of the first tank-based water heater.

4. The controller of claim 1, wherein the instructions, when executed by the one or more processors, further cause the controller to:
output instructions for a second tank-based water heater to supply a second additional heated water quantity to supplement the capacity of heated water and the first additional heated water quantity.

5. The controller of claim 4, wherein outputting instructions for the second tank-based water heater to supply the second additional heated water quantity comprises:
outputting instructions for a second valve to permit a second flow of unheated water into the second tank-based water heater.

6. The controller of claim 4, wherein the controller is in communication with a local controller of the second tank-based water heater.

7. The controller of claim 1, wherein a local controller of the tankless water heater is in communication with a local controller of the second tank-based water heater.

8. A non-transitory computer-readable medium having instructions stored thereon that, when executed by a processor, cause the processor to:
receive a request for requested heated water quantity;
determine, based on at least one flow sensor, that the requested heated water quantity of the heated water request is greater than a current available heated water capacity of any one of a plurality of water heaters; and
output, based on the determination using the at least one flow sensor that the requested heated water quantity of the heated water request is greater than a current available heated water capacity of the any one of the plurality of water heaters, instructions for two or more of the plurality of water heaters to supply heated water.

9. The non-transitory computer-readable medium of claim 8, wherein outputting the instructions for the two or more of the plurality of water heaters to supply heated water comprises:
outputting instructions for a first valve to permit a first flow of unheated water into the first water heater; and
outputting instructions for a second valve to permit a second flow of unheated water into the second water heater.

10. The non-transitory computer-readable medium of claim 8, wherein at least one of the two or more of the plurality of water heaters is a tankless water heater.

11. The non-transitory computer-readable medium of claim 8, wherein at least one of the two or more of the plurality of water heaters is a tank-based water heater.

12. The non-transitory computer-readable medium of claim 8, wherein:
at least one of the plurality of water heaters is a primary tankless water heater; and
at least one of the plurality of water heaters is a supplemental tank-based water heater.

13. The non-transitory computer-readable medium of claim 8, wherein the instructions, when executed by the processors, further cause the processor to:
designate a first local controller of a first water heater in the plurality of water heaters as a matter controller that controls each remaining water heater of the plurality of water heaters.

14. A method for providing heated water to a controller comprising:
receiving a request for a requested heated water quantity;
determining, based on at least one flow sensor, that a primary tankless water heater has a currently available heated water capacity that is less than the requested heated water quantity; and
outputting, based on the determination using at least one flow sensor that the primary tankless water heater has the currently available heated water capacity that is less than the requested heated water quantity, instructions for a supplemental tank-based water heater to supply a supplemental heated water quantity to supplement the currently available heated water capacity of the primary tankless water heater.

15. The method of claim 14, wherein outputting instructions for the supplemental tank-based water heater to supply the supplemental heated water quantity comprises:
outputting instructions for a valve to permit a flow of unheated water into the supplemental tank-based water heater.

16. The method of claim 14, wherein the supplemental tank-based water heater is a first supplemental tank-based water heater and the supplemental heated water quantity is a first supplemental heated water quantity, the method further comprising:
outputting instructions for a second supplemental tank-based water heater to supply a second supplemental heated water quantity to currently available heated water capacity of the primary tankless water heater and the first supplemental heated water quantity.

17. The method of claim 16, wherein outputting instructions for the second supplemental tank-based water heater to supply the second supplemental heated water quantity comprises:
outputting instructions for a valve to permit a flow of unheated water into the second supplemental tank-based water heater.

18. The method of claim 14, wherein outputting instructions for the supplemental tank-based water heater to supply a supplemental heated water quantity comprises instructing the supplemental tank-based water heater to supply the supplemental heated water quantity to the primary tankless water heater.

19. The method of claim 14, wherein outputting instructions for the supplemental tank-based water heater to supply a supplemental heated water quantity comprises instructing the supplemental tank-based water heater to supply the supplemental heated water quantity to the heated water demand.

* * * * *